US007321444B2

(12) United States Patent
Hirayama

(10) Patent No.: US 7,321,444 B2
(45) Date of Patent: Jan. 22, 2008

(54) PRINTHEAD, HEAD CARTRIDGE HAVING THE PRINTHEAD, PRINTING APPARATUS USING THE PRINTHEAD, AND PRINTHEAD ELEMENT SUBSTRATE

(75) Inventor: Nobuyuki Hirayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 795 days.

(21) Appl. No.: 09/902,756

(22) Filed: Jul. 12, 2001

(65) Prior Publication Data

US 2002/0036781 A1 Mar. 28, 2002

(30) Foreign Application Priority Data

Jul. 13, 2000 (JP) ............................ 2000-213203

(51) Int. Cl.
*G06F 15/00* (2006.01)
*G06K 1/00* (2006.01)

(52) U.S. Cl. ........................ 358/1.4; 358/1.8; 358/1.17

(58) Field of Classification Search ................ 358/1.1, 358/1.4, 1.8, 1.9, 1.16–1.18
See application file for complete search history.

(56) References Cited

U.S. PATENT DOCUMENTS

| | | | | |
|---|---|---|---|---|
| 4,313,124 | A | 1/1982 | Hara | 346/140 R |
| 4,345,262 | A | 8/1982 | Shirato et al. | 346/140 |
| 4,459,600 | A | 7/1984 | Sato et al. | 346/140 R |
| 4,463,359 | A | 7/1984 | Ayata et al. | 346/1.1 |
| 4,558,333 | A | 12/1985 | Sugitani et al. | 346/140 R |
| 4,723,129 | A | 2/1988 | Endo et al. | 346/1.1 |
| 4,740,796 | A | 4/1988 | Endo et al. | 346/1.1 |
| 5,539,433 | A * | 7/1996 | Kawai et al. | 347/13 |
| 6,331,048 | B1 * | 12/2001 | Takizawa | 347/57 |
| 6,493,109 | B1 * | 12/2002 | Takamura et al. | 358/1.18 |

FOREIGN PATENT DOCUMENTS

| | | |
|---|---|---|
| EP | 0 811 488 A2 * | 12/1997 |
| EP | 811488 A2 | 12/1997 |
| EP | 0 842 777 | 5/1998 |
| JP | 59-123670 | 7/1984 |
| JP | 59-138461 | 8/1984 |
| JP | 9-327914 | 12/1997 |

OTHER PUBLICATIONS

Patent Abstracts of Japan, vol. 1995 No. 02, Mar. 31, 1995, JP 06 305148 A, Nov. 1, 1994, Abstract.

* cited by examiner

*Primary Examiner*—David Moore
*Assistant Examiner*—James A. Thompson
(74) *Attorney, Agent, or Firm*—Fitzpatrick, Cella, Harper & Scinto

(57) ABSTRACT

In a printhead in which a plurality of printing elements arranged in a predetermined direction and a driving circuit for driving the printing elements are formed on a single substrate, the printing elements are classified into a plurality of groups. A selection circuit for selecting a printing element to be driven in each group, and data supply circuits for supplying driving data to the driving circuit for driving each printing element through any of a plurality of paths are arranged on the substrate. This realizes high-speed operation while suppressing increases in wiring length and substrate area even upon an increase in the number of printing elements and reducing the cost and generation of malfunctions.

13 Claims, 18 Drawing Sheets

PRINTHEAD, HEAD CARTRIDGE HAVING THE PRINTHEAD, PRINTING APPARATUS USING THE PRINTHEAD, AND PRINTHEAD ELEMENT SUBSTRATE

FIELD OF THE INVENTION

The present invention relates to a printhead, a head cartridge having the printhead, a printing apparatus using the printhead, and a printhead element substrate and, more particularly, to a printhead in which a plurality of printing elements arranged in a predetermined direction and a driving circuit for driving the printing elements are formed on a single substrate, a head cartridge having the printhead, a printing apparatus using the printhead, and a printhead element substrate.

The present invention is applicable to a general printing apparatus, an apparatus such as a copying machine, a facsimile with a communication system, or a wordprocessor with a printing unit, and an industrial printing apparatus combined with various processing apparatuses.

BACKGROUND OF THE INVENTION

In general, serial recording systems for printing data while reciprocating in a direction perpendicular to the feed direction of a printing medium such as a sheet are widely adopted in terms of low cost and easy downsizing in printing apparatuses for printing information such as desired characters or images on a sheet-like printing medium such as a sheet or film, as the information output apparatuses of a wordprocessor, personal computer, and facsimile.

The structure of a printhead used in such a printing apparatus will be described by exemplifying an inkjet printhead for printing data by using thermal energy. The inkjet printhead has, as printing elements, heating elements (heaters) disposed at portions communicating with orifices (nozzles) for discharging ink droplets. A current is supplied to the heating elements to generate heat and form bubbles in the ink to discharge ink droplets, thereby printing data. This printhead enables laying out many orifices and heating elements (heaters) at high density, and can realize a fine printing image.

To print data by this printhead at high speed, it is desirable to simultaneously drive many heaters. However, the number of simultaneously drivable heaters is limited due to restriction on the power supply ability of a power supply and a voltage drop caused by the parasitic resistance of wiring. For this reason, the maximum current value is suppressed by dividing a heater array into groups each including a plurality of heaters and time-divisionally driving heaters within a group.

A circuit arrangement for this driving is disclosed in Japanese Patent Laid-Open No. 9-327914. FIG. 16 is a circuit diagram showing an arrangement of 128 heaters and their driving circuit.

In FIG. 16, reference-symbols H1 to H128 denote heaters as printing elements; and T1 to T128, transistors for driving the respective heaters. Reference numeral 600 denotes a 4 to 16 decoder for decoding block control signals B1, B2, B3, and B4 supplied from a printer main body and generating block selection signals N1, N2, . . . , N16; 603, an 8-bit shift register for serially receiving printing data DATA in accordance with a clock signal CK supplied from the printer main body; 604, an 8-bit latch circuit for latching 8-bit printing data DATA stored in the 8-bit shift register 603 in accordance with a latch signal LATCH supplied from the printer; and 605, an AND circuit for deriving a logical product of an enable signal ENB and the bits of the 8-bit data latched by the 8-bit latch circuit 604.

Outputs from the AND circuit 605 are supplied as printing signals D1 to D8 to the heating elements. The driving timings and pulse widths of the heating elements are determined by the outputs from the AND circuit 605 and the block selection signals N1 to N16 as outputs from the 4 to 16 decoder 600. When the enable signal ENB is “High”, the heating elements are driven.

FIG. 17 is a timing chart showing the states of signals concerning driving of the printhead in the arrangement shown in FIG. 16. According to this timing chart, the serial transfer timing of printing data to the 8-bit shift register 603 does not overlap the driving timing of the heating element.

In many cases, printing elements (heaters) and their driving circuit are formed on one substrate by a semiconductor manufacturing technique in order to achieve high integration degree.

FIG. 18 shows a layout in which the circuit of FIG. 16 is formed on a printing element substrate. In FIG. 18, reference numeral 801 denotes an ink supply opening which allows ink to pass from the lower surface of the substrate and to be supplied onto the upper surface of the substrate. Two systems of circuits in FIG. 16 are symmetrically arranged on the two sides of the ink supply opening 801 formed at the center of the substrate. Heaters and transistors are laid out in the longitudinal direction of the ink supply opening 801. Decoders 600, shift registers 603, and latch circuits 604 are disposed on the two sides in a direction along which heater arrays extend. Signal lines from the decoders and shift registers to the heaters are laid out parallel to the heater array direction.

To meet demands for high printing speed and high resolution, the numbers of nozzles and heaters of the printhead increase, which poses the following problem with the printing element substrate.

As the number of heaters increases, the number of signal lines for selecting the heaters also increases. As for the shape of the printing element substrate, the dimension of the board in the heater array direction increases along with an increase in the number of heaters. The dimension of the board in a direction perpendicular to the heater array direction also increases because of wiring lines connected to the heater driving circuit. As a result, the board area greatly increases.

When a board is formed on a wafer by a semiconductor manufacturing technique, an increase in board area decreases the number of boards per wafer and yield, thereby extremely increasing the cost of the printing element substrate.

As the dimension of the board in the heater array direction increases along with an increase in the number of nozzles, wiring lengths from the decoder and shift register also increase. This causes signal delays between the input and the heater driving circuit, inhibiting high-speed driving. Further, the printhead is readily influenced by external noise and may malfunction.

SUMMARY OF THE INVENTION

It is an object of the present invention to provide a printhead capable of operating at high speed while suppressing increases in wiring length and board area even upon an increase in the number of printing elements and reducing the cost and generation of malfunctions, a head cartridge having the printhead, and a printing apparatus using the printhead.

It is another object of the present invention to provide a printhead element substrate capable of operating at high speed while suppressing increases in wiring length and board area even upon an increase in the number of printing elements and reducing the cost and generation of malfunctions.

According to the present invention, the above objects are achieved by a printhead in which a plurality of printing elements arranged in a predetermined direction and a driving circuit for driving the printing elements are formed on a single substrate, wherein the printing elements are classified into a plurality of groups and driven, and a selection circuit which is common to the plurality of groups and selects a printing element to be driven in each group, and data supply circuits for supplying driving data to the driving circuit for driving each printing element through any of a plurality of paths are arranged on the substrate.

More specifically, in a printhead in which a plurality of printing elements arranged in a predetermined direction and a driving circuit for driving the printing elements are formed on a single substrate, the printing elements are classified into a plurality of groups, and a selection circuit for selecting a printing element to be driven in each group, and data supply circuits for supplying driving data to the driving circuit for driving each printing element through any of a plurality of paths are arranged on the substrate.

This arrangement can reduce the area occupied by signal lines for supplying data to the driving circuit even if the number of printing elements increases, and can effectively reduce the chip size of the element substrate of the printhead.

Hence, the cost of the element substrate of the printhead can be reduced, suppressing the costs of the printhead, head cartridge, and printing apparatus. The signal lines for supplying data can be shortened, which is effective for high-speed driving. Malfunctions by external noise can be suppressed, and high-reliability printing operation can be performed.

The data supply circuits preferably supply the driving data through a path which shortens a wiring line to each printing element.

The data supply circuits are preferably arranged on two sides of a printing element array.

The data supply circuits more preferably include a plurality of shift registers for receiving clock and data signals, a plurality of latches for latching output signals from the shift registers, and AND circuits for deriving a logical product of outputs from the latches and a driving signal.

The printhead includes an inkjet printhead for printing data by discharging ink. More particularly, it is preferable that the printhead include a printhead for discharging the ink by using thermal energy, and comprise an electrothermal transducer for generating thermal energy to be applied to the ink.

According to the present invention, the above objects are achieved by a head cartridge comprising the above-described printhead, and an ink tank for storing ink to be supplied to the printhead.

According to the present invention, the above objects are achieved by a printing apparatus for printing data by using the above-described printhead, comprising driving data generation means for generating a data signal for each path of the data supply circuit.

According to the present invention, the above objects are achieved by a printhead element substrate in which a plurality of printing elements arranged in a predetermined direction and a driving circuit for driving the printing elements are formed on a single substrate, wherein the printing elements are classified into a plurality of groups and driven, and a selection circuit which is common to the plurality of groups and selects a printing element to be driven in each group, and data supply circuits for supplying driving data to the driving circuit for driving each printing element through any of a plurality of paths are arranged on the substrate.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In the embodiments to be explained below, a printing apparatus using an inkjet printing system will be described by taking a printer as an example.

In this specification, "print" is not only to form significant information such as characters and graphics but also to form, e.g., images, figures, and patterns on printing media in a broad sense, regardless of whether the information formed is significant or insignificant or whether the information formed is visualized so that a human can visually perceive it, or to process printing media.

"Printing media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

An "substrate" (to be also referred to as an "element substrate" hereinafter) includes not only a base plate made of such as a silicon semiconductor but also a base plate bearing elements and wiring lines.

The following expression "on an substrate" means "the surface of an substrate" or "the inside of an substrate near its surface" in addition to "on an substrate". "Built-in" in the present invention does not represent a simple layout of separate elements on a base, but represents integral formation/manufacture of elements on an substrate by a semiconductor circuit manufacturing process.

[Apparatus Main Body]

Figure 1:
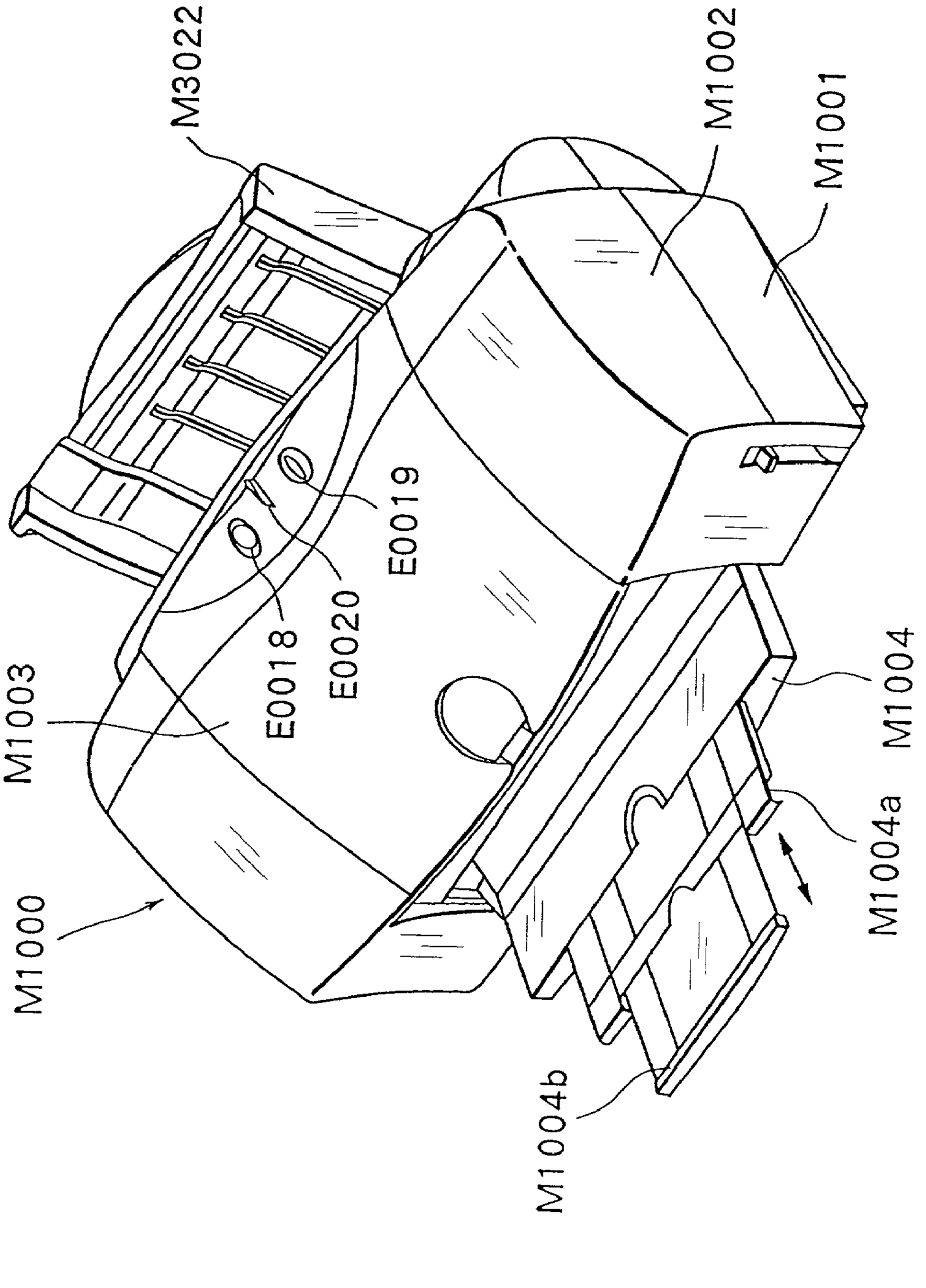
FIG. 1 is a perspective view showing the external appearance of an inkjet printer according to an embodiment of the present invention.
Figure 2:
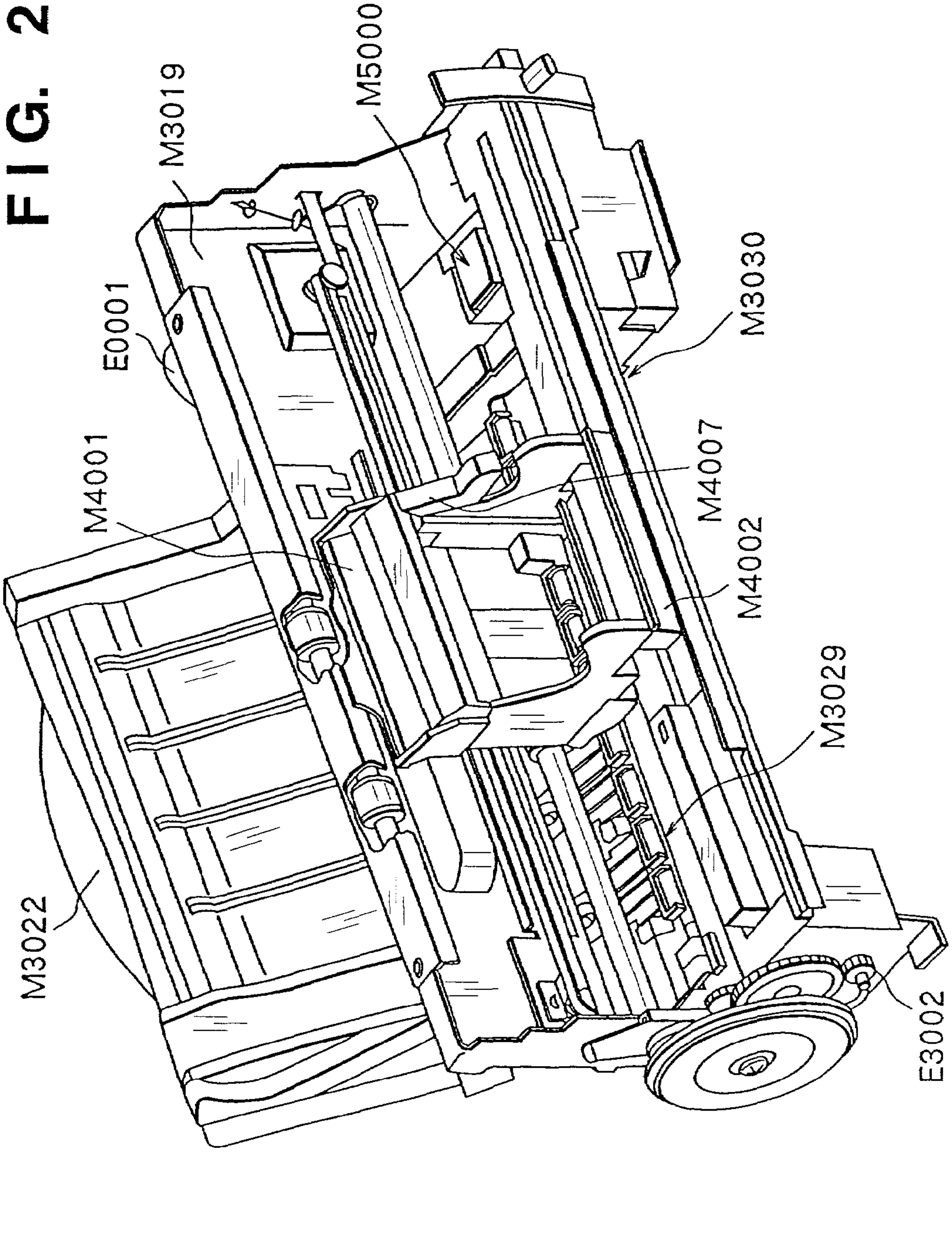
FIG. 2 is a perspective view showing the state in which external parts of the printer shown in FIG. 1 are removed.

FIGS. 1 and 2 show an outline of the arrangement of a printer using an inkjet printing system. Referring to FIG. 1, an apparatus main body M1000 as a shell of the printer according to this embodiment is composed of external members, i.e., a lower case M1001, upper case M1002, access cover M1003, and delivery tray M1004, and a chassis M3019 (FIG. 2) accommodated in these external members.

The chassis M3019 is made of a plurality of plate-like metal members having predetermined stiffness, forms a framework of the printing apparatus, and holds various printing mechanisms to be described later.

The lower case M1001 forms a substantially lower half of the apparatus main body M1000, and the upper case M1002 forms a substantially upper half of the apparatus main body M1000. The combination of these two cases forms a hollow structure having a housing space for housing diverse mechanisms to be described later. Openings are formed in the top surface and the front surface of this hollow structure.

One end portion of the delivery tray M1004 is rotatably held by the lower case M1001. By rotating this delivery tray M1004, the opening formed in the front surface of the lower case M1001 can be opened and closed. When printing is to be executed, therefore, the delivery tray M1004 is rotated forward to open the opening to allow printing sheets to be delivered from this opening, and delivered printing sheets P can be stacked in order. Also, the delivery tray M1004 accommodates two auxiliary trays M1004*a* and M1004*b*. By pulling each tray forward as needed, the sheet support area can be increased and reduced in three steps.

One end portion of the access cover M1003 is rotatably held by the upper case M1002. This allows this access cover M1003 to open and close the opening formed in the top surface of the upper case M1002. By opening this access cover M1003, a printhead cartridge H1000 or an ink tank H1900 housed inside the main body can be replaced. Although not shown, when the access cover M1003 is opened or closed, a projection formed on the rear surface of this access cover M1003 rotates a cover opening/closing lever. A microswitch or the like detects the rotated position of this lever. In this way, the open/closed state of the access cover can be detected.

Figure 7:
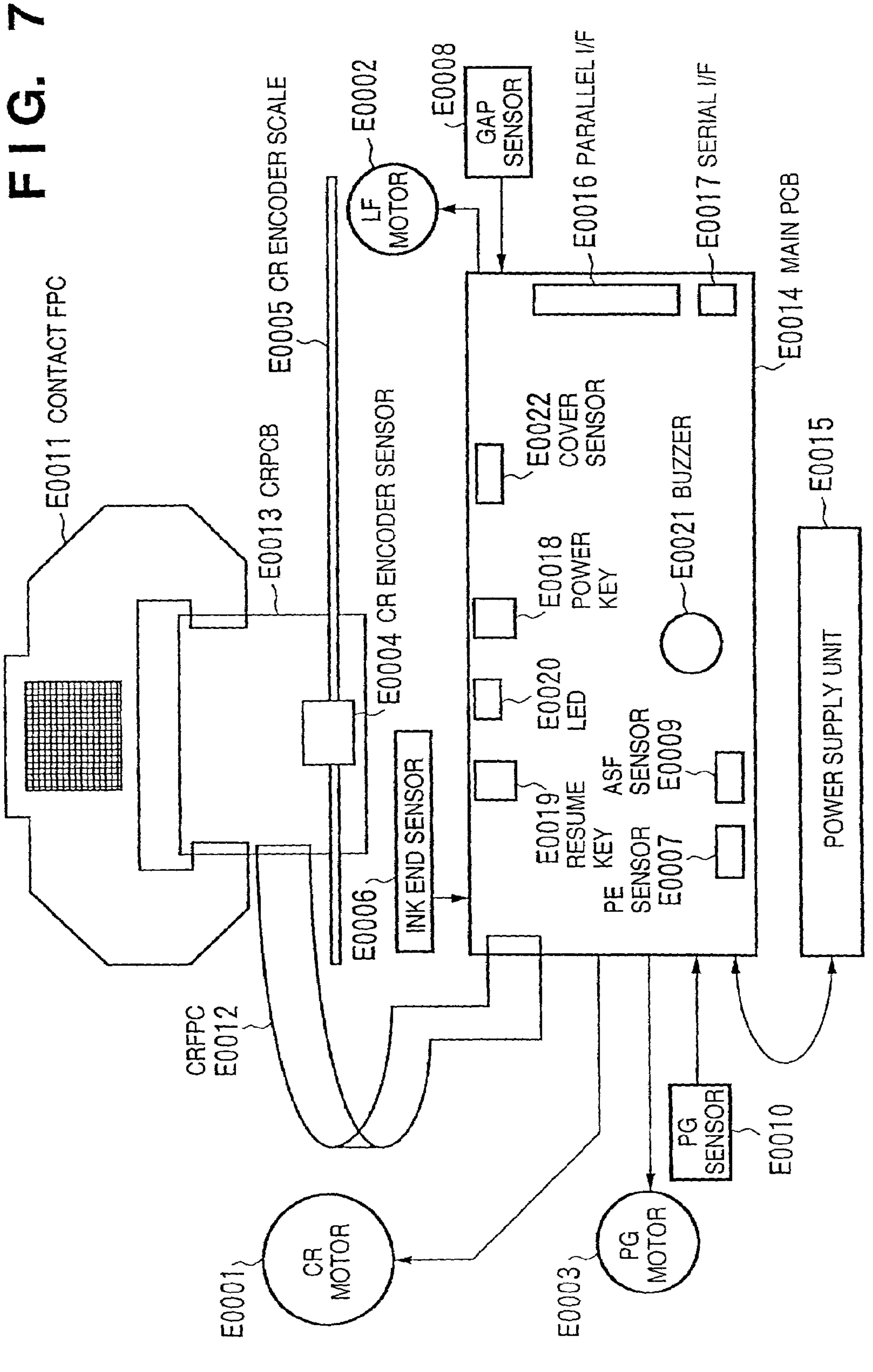
FIG. 7 is a block diagram schematically showing the overall arrangement of an electronic circuit in the embodiment of the present invention.

On the top surface in the rear portion of the upper case M1002, a power key E0018 and a resume key E0019 are arranged to be able to be pressed, and an LED E0020 is also arranged. When the power key E0018 is pressed, the LED E0020 is turned on to inform the operator that printing is possible. This LED E0020 has various display functions, e.g., informs the operator of a trouble of the printer by changing the way the LED E0020 turns on and off, changing the color of light, or sounding a buzzer E0021 (FIG. 7). When the trouble is solved, printing is restarted by pressing the resume key E0019.

[Printing Mechanisms]

Printing mechanisms of this embodiment housed in and held by the apparatus main body M1000 of the above printer will be described below.

The printing mechanisms according to this embodiment are: an automatic feeder M3022 for automatically feeding the printing sheets P into the apparatus main body; a conveyor unit M3029 for guiding the printing sheets P fed one by one from the automatic feeder to a desired printing position and guiding these recording sheets P from the printing position to a delivery unit M3030; a printing unit for performing desired printing on each printing sheet P conveyed by the conveyor unit M3029; and a recovery unit (M5000) for recovering, e.g., the printing unit.

(Printing Unit)

The printing unit will be described below.

This printing unit includes a carriage M4001 movably supported by a carriage shaft M4021, and the printhead cartridge H1000 detachably mounted on this carriage M4001.

(Printhead Cartridge)

First, the printhead cartridge will be described with reference to FIGS. 3 to 5.

Figure 3:
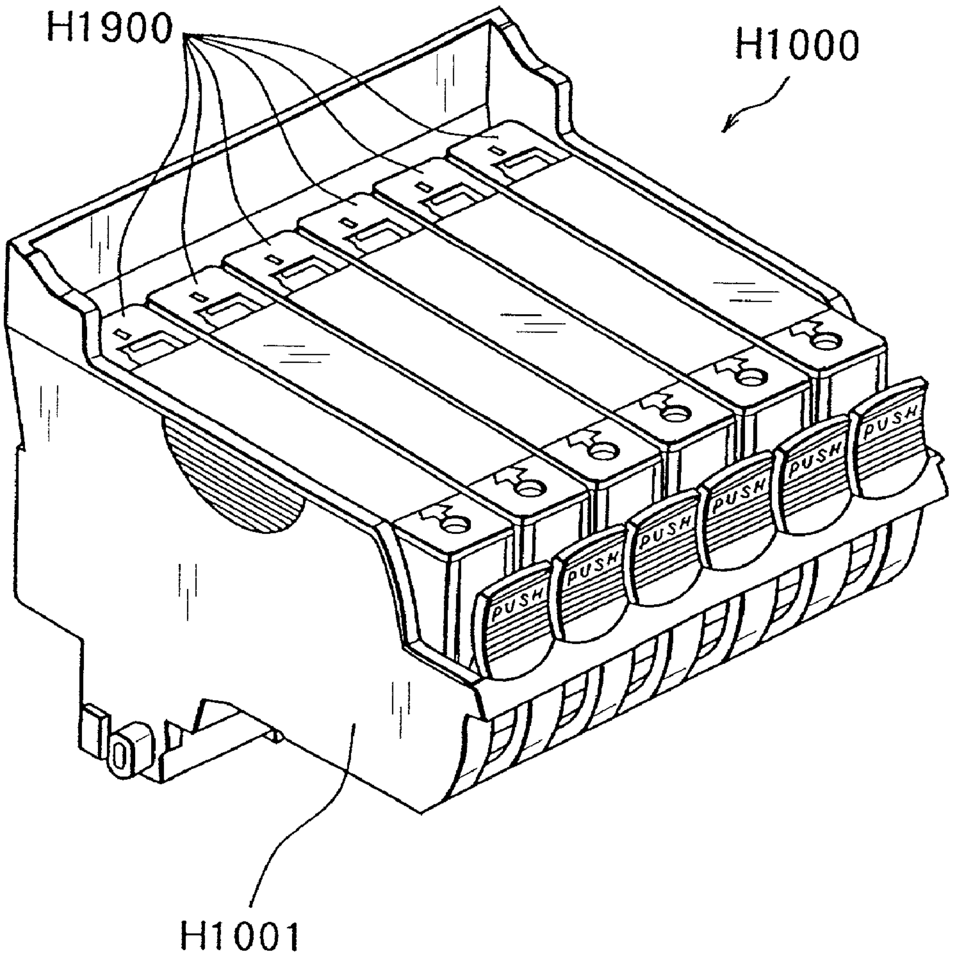
FIG. 3 is an exploded perspective view showing a printhead cartridge used in the embodiment of the present invention.
Figure 4:
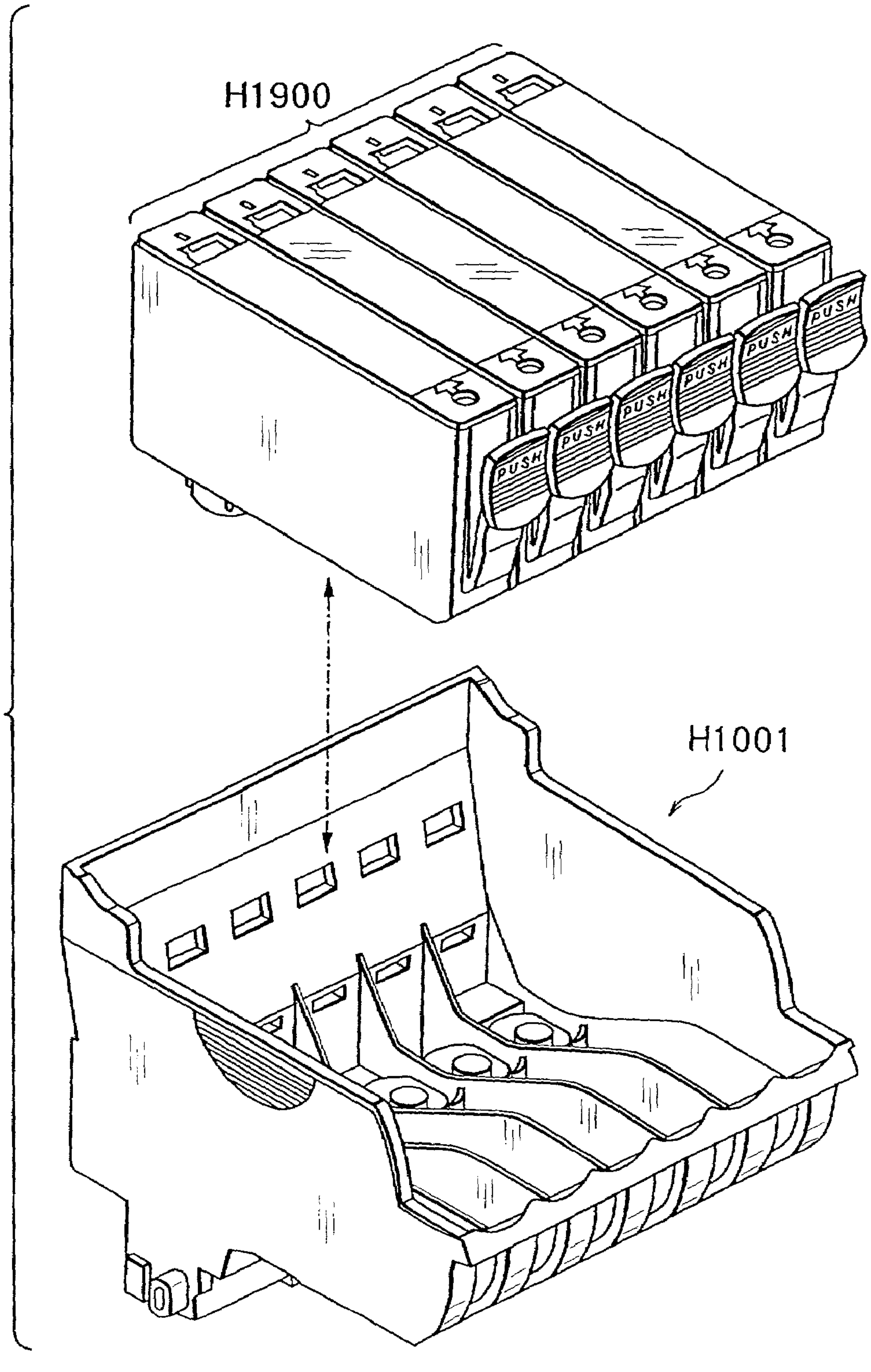
FIG. 4 is a side view showing the state in which the printhead cartridge shown in FIG. 3 is assembled.

As shown in FIG. 3, the printhead cartridge H1000 of this embodiment has the ink tank H1900 containing ink and a printhead H1001 for discharging the ink supplied from this ink tank H1900 from nozzles in accordance with printing information. This printhead H1001 is of a so-called cartridge type detachably mounted on the carriage M4001 (to be described later).

To make photographic high-quality color printing feasible, the printhead cartridge H1000 of this embodiment includes independent color ink tanks, e.g., black, light cyan, light magenta, cyan, magenta, and yellow ink tanks. As shown in FIG. 4, these ink tanks can be independently attached to and detached from the printhead H1001.

Figure 5:
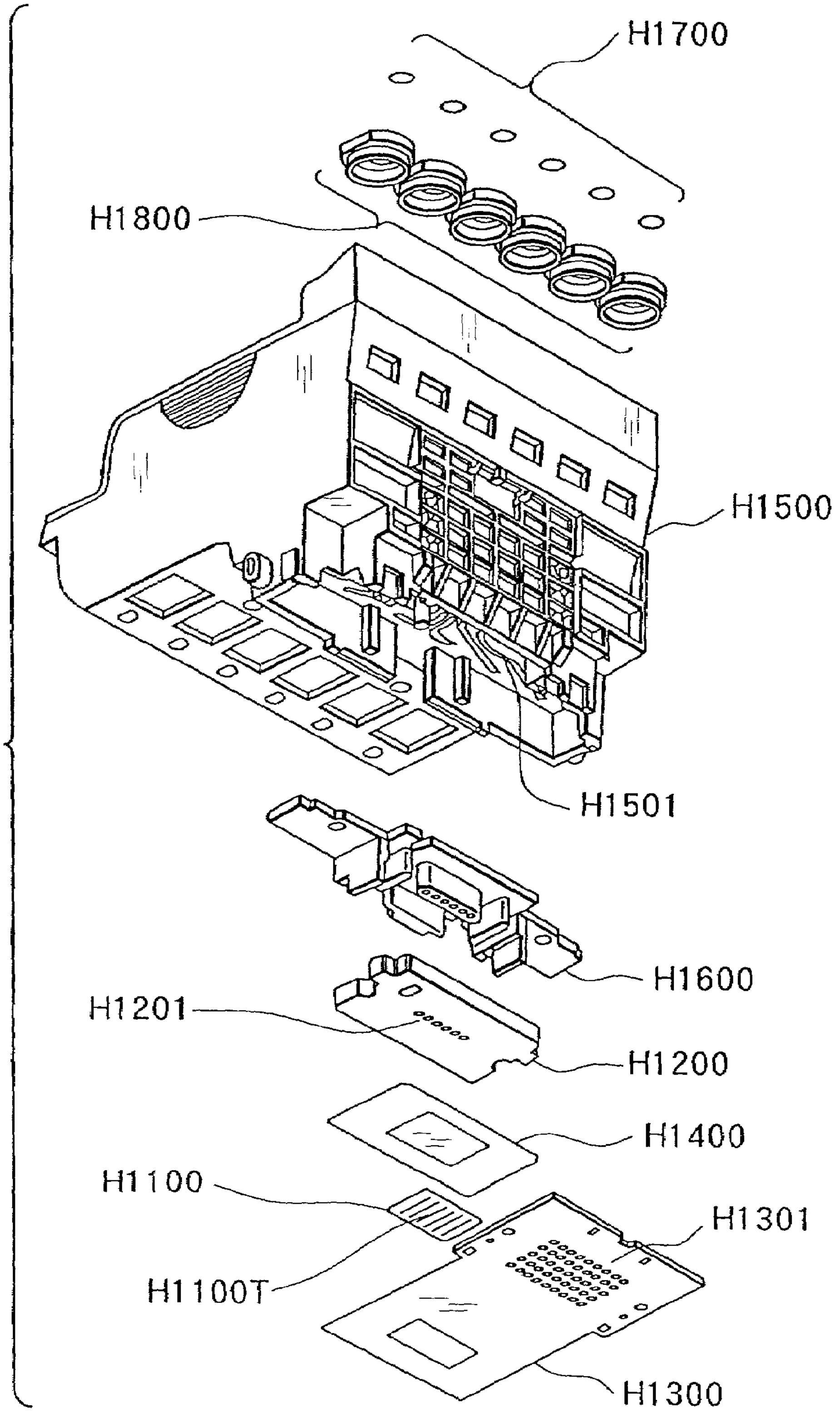
FIG. 5 is a perspective view showing the printhead of FIG. 4 when obliquely viewed from below.

As shown in an exploded perspective view of FIG. 5, the printhead H1001 comprises a printing element substrate H1100, first plate H1200, electrical printed circuit board H1300, second plate H1400, tank holder H1500, channel forming member H1600, filters H1700, and sealing rubber members H1800.

On the printing element substrate H1100, a plurality of printing elements for discharging ink and electric lines made of, e.g., Al for supplying electric power to these printing elements are formed on one surface of an Si substrate by film formation technologies. A plurality of ink channels and a plurality of discharge orifices H1100T corresponding to the printing elements are formed by photolithography. Also, ink supply openings for supplying ink to these ink channels are formed in the rear surface. This printing element substrate H1100 is fixed to the first plate H1200 by adhesion. Ink supply openings H1201 for supplying ink to the printing element substrate H1100 are formed in this first plate H1200. Furthermore, the second plate H1400 having an opening is fixed to the first plate H1200 by adhesion. This second plate H1400 holds the electric printed circuit board 1300 such that the electric printed circuit board H1300 and the printing element substrate H1100 are electrically connected.

This electric printed circuit board H1300 applies an electrical signal for discharging ink to the printing element substrate H1100. The electric printed circuit board H1300 has electric lines corresponding to the printing element substrate H1100, and external signal input terminals H1301 formed in end portions of these electric lines to receive electrical signals from the main body. The external signal input terminals H1301 are positioned and fixed at the back of the tank holder H1500.

The channel forming member H1600 is ultrasonically welded to the tank holder H1500 for detachably holding the ink tanks H1900, thereby forming ink channels H1501 from the ink tanks H1900 to the first plate H1200. Also, the filters H1700 are formed at those end portions of the ink channels H1501, which engage with the ink tanks H1900, to prevent invasion of dust from the outside. The sealing rubber members H1800 are attached to the portions engaging with the ink tanks H1900 to prevent evaporation of ink from these engaging portions.

Furthermore, the printhead H1001 is constructed by bonding, by an adhesive or the like, a tank holder unit composed of the tank holder H1500, channel forming member H1600, filters H1700, and sealing rubber members H1800 to a printing element unit composed of the printing element substrate H1100, first plate H1200, electric printed circuit board H1300, and second plate H1400.

(Carriage)

The carriage M4001 will be described below with reference to FIG. 2.

As shown in FIG. 2, this carriage M4001 includes a carriage cover M4002 and head set lever M4007. The carriage cover M4002 engages with the carriage M4001 and guides the printhead H1001 to the mount position of the carriage M4001. The head set lever M4007 engages with the tank holder H1500 of the printhead H1001 and pushes the printhead H1000 such that the printhead H1000 is set in a predetermined mount position.

That is, the head set lever M4007 is set in the upper portion of the carriage M4001 so as to be pivotal about a head set level shaft. Also, a head set plate (not shown) is set via a spring in a portion which engages with the printhead H1001. By the force of this spring, the printhead H1001 is pushed and mounted on the carriage M4001.

A contact flexible print cable (to be referred to as a contact FPC hereinafter) E0011 is set in another engaging portion of the carriage M4001 with respect to the printhead H1001. Contact portions E0011*a* on this contact FPC E0011 and the contact portions (external signal input terminals) H1301 formed on the printhead H1001 electrically contact each other to exchange various pieces of information for printing or supply electric power to the printhead H1001.

An elastic member (not shown) made of, e.g., rubber is formed between the contact portions E0011*a* of the contact FPC E0011 and the carriage M4001. The elastic force of this elastic member and the biasing force of the head set lever spring make reliable contact between the contact portions E0011*a* and the carriage M4001 possible. Furthermore, the contact FPC E0011 is connected to a carriage printed circuit board E0013 mounted on the back surface of the carriage M4001 (FIG. 7).

[Scanner]

The printer of this embodiment is also usable as a reading apparatus by replacing the printhead with a scanner.

This scanner moves together with the carriage of the printer and reads an original image supplied instead of a printing medium in a sub-scan direction. Information of one original image is read by alternately performing the read operation and the original feed operation.

Figure 6B:
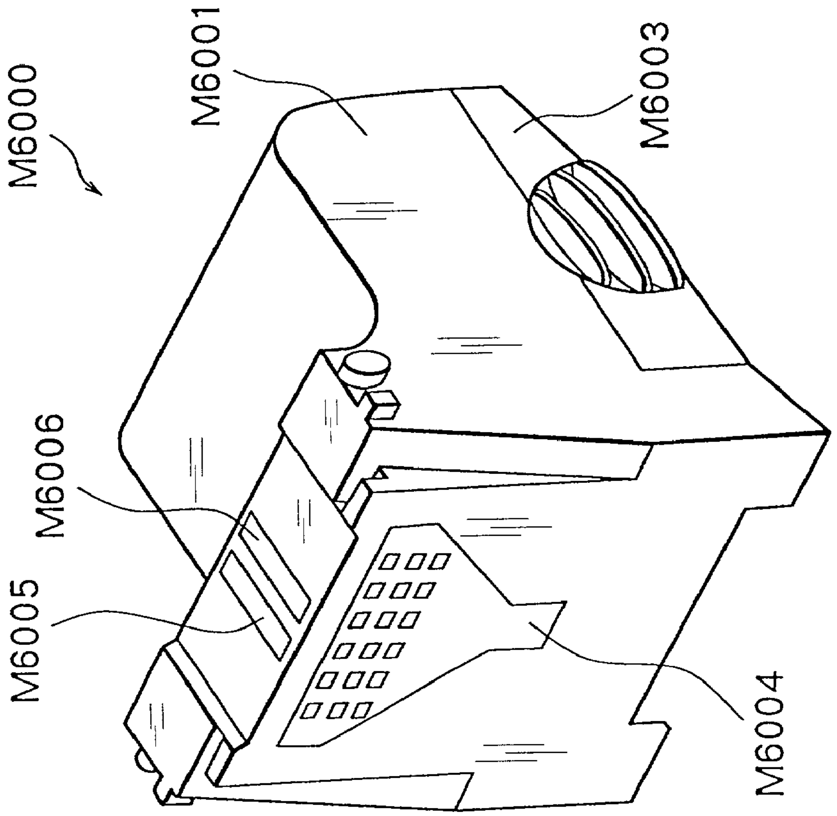
FIGS. 6A and 6B are perspective views showing a scanner cartridge in the embodiment of the present invention.
Figure 6A:
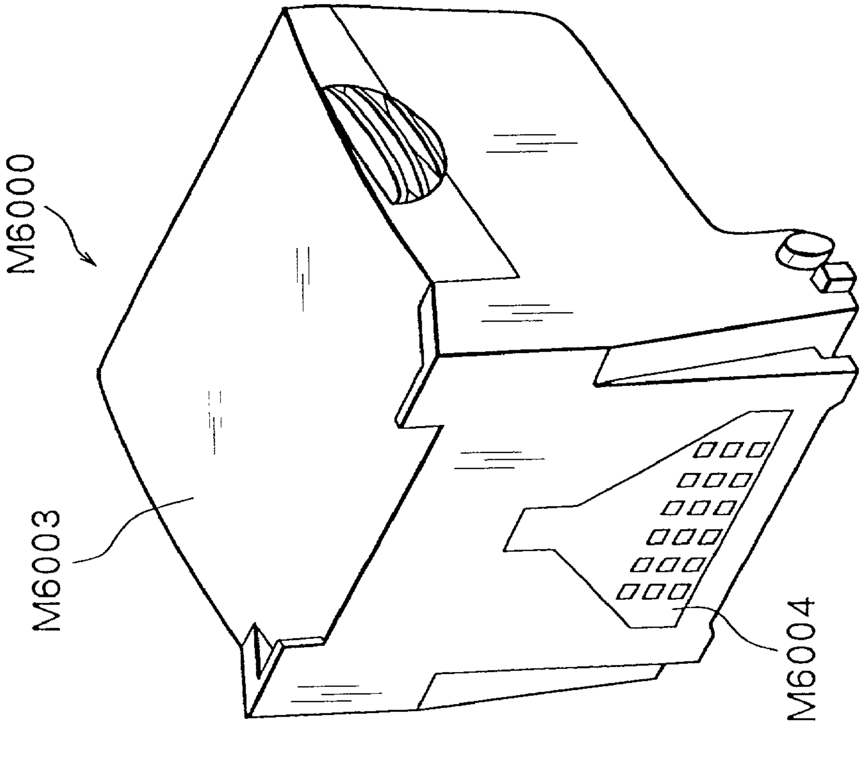

FIGS. 6A and 6B are views showing an outline of the arrangement of this scanner M6000.

As shown in FIG. 6B, a scanner holder M6001 has a box-like shape and contains optical systems and processing circuits necessary for reading. A scanner read lens M6006 is placed in a portion which faces the surface of an original when this scanner M6000 is mounted on the carriage M4001. This scanner read lens M6006 reads an original image. A scanner illuminating lens M6005 contains a light source (not shown), and light emitted by this light source irradiates an original.

A scanner cover M6003 fixed to the bottom portion of the scanner holder M6001 so fits as to shield the interior of the scanner holder M6001 from light. Louver-like handles formed on the side surfaces of this scanner cover M6003 facilitate attachment to and detachment from the carriage M4001. The external shape of the scanner holder M6001 is substantially the same as the printhead cartridge H1000. So, the scanner holder M6001 can be attached to and detached from the carriage M4001 by operations similar to the printhead cartridge H1000.

Also, the scanner holder M6001 accommodates a board having the processing circuits described above and a scanner contact PCB M6004 connected to this board and exposed to the outside. When the scanner M6000 is mounted on the carriage M4001, this scanner contact PCB M6004 comes in contact with the contact FPC E0011 of the carriage M4001, thereby electrically connecting the board to the control system of the main body via the carriage M4001.

An electric circuit configuration in this embodiment of the present invention will be described next.

FIG. 7 is a view schematically showing the overall arrangement of an electric circuit in this embodiment.

The electric circuit of this embodiment primarily comprises the carriage printed circuit board (CRPCB) E0013, a main PCB (Printed Circuit Board) E0014, and a power supply unit E0015.

The power supply unit is connected to the main PCB E0014 to supply various driving power.

The carriage printed circuit board E0013 is a printed circuit board unit mounted on the carriage M4001 (FIG. 2) and functions as an interface for exchanging signals with the printhead through the contact FPC E0011. Also, on the basis of a pulse signal output from an encoder sensor E0004 in accordance with the movement of the carriage M4001, the carriage printed circuit board E0013 detects changes in the positional relationship between an encoder scale E0005 and the encoder sensor E0004 and outputs a signal to the main PCB E0014 through a flexible flat cable (CRFFC) E0012.

The main PCB is a printed circuit board unit for controlling driving of individual parts of the inkjet printing apparatus of this embodiment. This main PCB has, on the board, I/O ports for, e.g., a paper end sensor (PE sensor) E0007, an ASF sensor E0009, a cover sensor E0022, a parallel interface (parallel I/F) E0016, a serial interface (serial I/F) E0017, the resume key E0019, the LED E0020, the power key E0018, and the buzzer E0021. The main PCB is also connected to a CR motor E0001, an LF motor E0002, and a PG motor E0003 to control driving of these motors. Additionally, the main PCB has interfaces connecting to an ink end sensor E0006, a GAP sensor E0008, a PG sensor E0010, a CRFFC E0012, and the power supply unit E0015.

Figure 8:
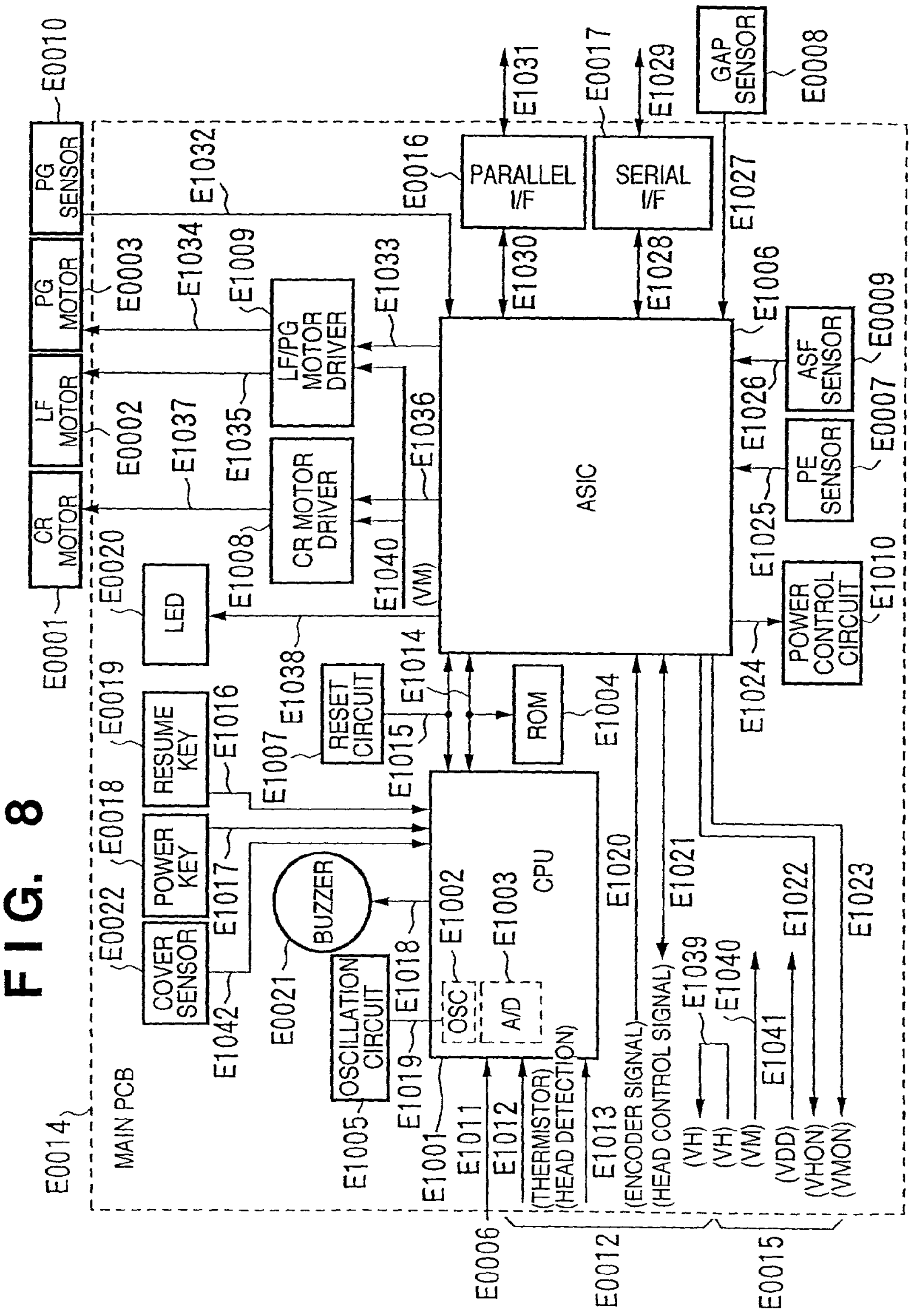
FIG. 8 is a block diagram showing the internal arrangement of a main PCB shown in FIG. 7.

FIG. 8 is a block diagram showing the internal arrangement of the main PCB.

Referring to FIG. 8, a CPU E1001 internally has an oscillator OSC E1002 and is connected to an oscillation circuit E1005 to generate a system clock by an output signal E1019 from the oscillation circuit E1005. Also, the CPU E1001 is connected to a ROM E1004 and an ASIC (Application Specific Integrated Circuit) E1006. In accordance with programs stored in the ROM E1004, the CPU E1001 controls the ASIC and senses the statuses of an input signal E1017 from the power key, an input signal E1016 from the resume key, a cover sensing signal E1042, and a head sensing signal (HSENS) E1013. Additionally, the CPU E1001 drives the buzzer E0021 by a buzzer signal (BUZ) E1018 and senses the statuses of an ink end sensing signal (INKS) E1011 and a thermistor temperature sensing signal (TH) E1012 connected to a built-in A/D converter E1003. Furthermore, the CPU E1001 controls driving of the inkjet printing apparatus by performing various logic operations and condition judgements.

The head sensing signal E1013 is a head mounting sensing signal which the printhead cartridge H1000 inputs via the flexible flat cable E0012, the carriage printed circuit board E0013, and the contact flexible print cable E0011. The ink end sensing signal is an output analog signal from the ink end sensor E0006. The thermistor temperature sensing signal E1012 is an analog signal from a thermistor (not shown) formed on the carriage printed circuit board E0013.

A CR motor driver E1008 is supplied with motor power (VM) E1040 as a driving source. In accordance with a CR motor control signal E1036 from the ASIC E1006, the CR motor driver E1008 generates a CR motor driving signal E1037 to drive the CR motor E0001. An LF/PG motor driver E1009 is also supplied with the motor power E1040 as a driving source. In accordance with a pulse motor control signal (PM control signal) E1033 from the ASIC E1006, the LF/PG motor driver E1009 generates an LF motor driving signal E1035 to drive the LF motor and also generates a PG motor driving signal E1034 to drive the PG motor.

A power control circuit E1010 controls power supply to each sensor having a light-emitting element, in accordance with a power control signal E1024 from the ASIC E1006. The parallel I/F E0016 transmits a parallel I/F signal E1030 from the ASIC E1006 to a parallel I/F cable E1031 connected to the outside, and transmits signals from this parallel I/F cable E1031 to the ASIC E1006. The serial IF E0017 transmits a serial I/F signal E1028 from the ASIC E1006 to a serial I/F cable E1029 connected to the outside, and transmits signals from this cable E1029 to the ASIC E1006.

The power supply unit E0015 supplies head power (VH) E1039, the motor power (VM) E1040, and logic power (VDD) E1041. A head power ON signal (VHON) E1022 and a motor power ON signal (VMOM) E1023 from the ASIC E1006 are input to the power supply unit E0015 to control ON/OFF of the head power E1039 and the motor power E1040, respectively. The logic power (VDD) E1041 supplied from the power supply unit E0015 is subjected to voltage transformation where necessary and supplied to individual units inside and outside the main PCB E0014.

The head power E1039 is smoothed on the main PCB E0014, supplied to the flexible flat cable E0011, and used to drive the printhead cartridge H1000.

A reset circuit E1007 detects a decrease in the logic power-supply voltage E1040 and supplies a reset signal (RESET) E1015 to the CPU E1001 and the ASIC E1006 to initialize them.

This ASIC E1006 is a one-chip semiconductor integrated circuit which is controlled by the CPU E1001 via a control bus E1014, outputs the CR motor control signal E1036, the PM control signal E1033, the power control signal E1024, the head power ON signal E1022, and the motor power ON signal E1023, and exchanges signals with the parallel I/F E10016 and the serial I/F E0017. Also, the ASIC E1006 senses the statuses of a PE sensing signal (PES) E1025 from the PE sensor E0007, an ASF sensing signal (ASFS) E1026 from the ASF sensor E0009, a GAP sensing signal (GAPS) E1027 from the GAP sensor E0008, and a PG sensing signal (PGS) E1032 from the PG sensor E0010, and transmits data indicating the statuses to the CPU E1001 through the control bus E1014. On the basis of the input data, the CPU E1001 controls driving of the LED driving signal E1038 to turn on and off the LED E0020.

Furthermore, the ASIC E1006 senses the status of an encoder signal (ENS) E1020 to generate a timing signal and interfaces with the printhead cartridge H1000 by a head control signal E1021, thereby controlling a printing operation. The encoder signal (ENC) E1020 is an output signal from the CR encoder sensor E0004, that is input through the flexible flat cable E0012. The head control signal E1021 is supplied to the printhead cartridge E1000 through the flexible flat cable E0012, the carriage printed circuit board E0013, and the contact FPC E0011.

Figure 9:
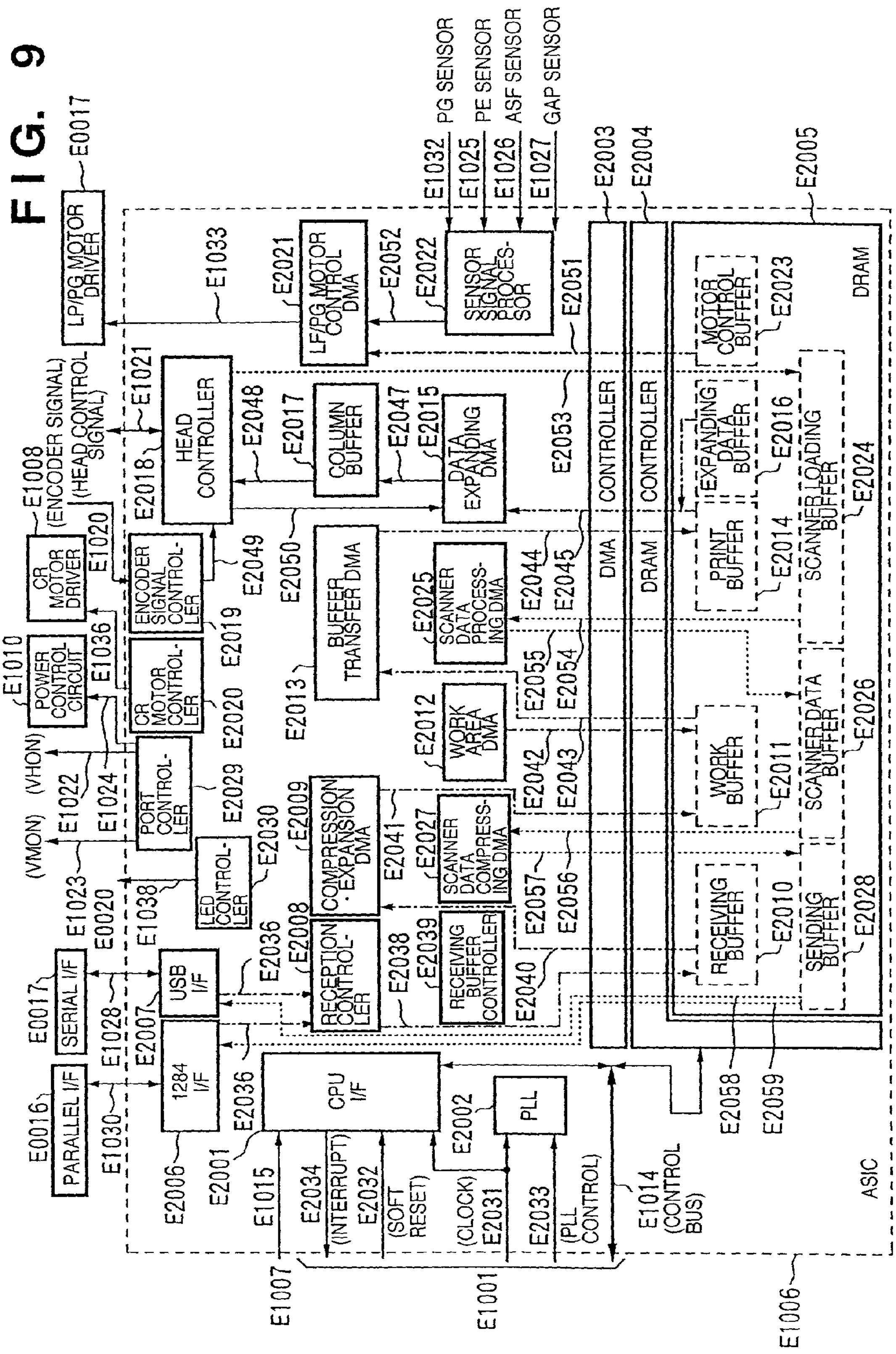
FIG. 9 is a block diagram showing the internal arrangement of an ASIC shown in FIG. 8.

FIG. 9 is a block diagram showing the internal arrangement of the ASIC E1006.

Referring to FIG. 9, only flows of data, such as printing data and motor control data, pertaining to control of the head and each mechanical part are shown in connections between individual blocks. Control signals and clocks concerning read and write of a built-in register in each block and control signals related to DMA control are omitted to avoid the complexity of description in the drawing.

As shown in FIG. 9, a PLL E2002 generates a clock (not shown) to be supplied to the most part of the ASIC E1006, in accordance with a clock signal (CLK) E2031 and PLL control signal (PLLON) E2033 output from the CPU E1001.

A CPU interface (CPU I/F) E2001 controls read and write to a register in each block (to be described below), supplies clocks to some blocks, and accepts an interrupt signal (none of these functions is shown), in accordance with the reset signal E1015, a soft reset signal (PDWN) E2032 and the clock signal (CLK) E2031 output from the CPU E1001, and a control signal from the control bus E1014. This CPU I/F E2001 outputs an interrupt signal (INT) E2034 to the CPU E1001 to inform the CPU E1001 of generating an interrupt in the ASIC E1006.

A DRAM E2005 has areas such as a receiving buffer E2010, work buffer E2011, print buffer E2014, and expanding data buffer E2016, as printing data buffers, and also has a motor control buffer E2023 for motor control. In addition to these printing data buffers, the DRAM E2005 has areas such as a scanner loading buffer E2024, scanner data buffer E2026, and sending buffer E2028, as buffers for use in a scanner operation mode.

This DRAM E2005 is also used as a work area necessary for the operation of the CPU E1001. That is, a DRAM controller E2004 switches between access from the CPU E1001 to the DRAM E2005 using the control bus and access from a DMA controller E2003 (to be described below) to the DRAM E2005, thereby performing read and write to the DRAM E2005.

The DMA controller E2003 accepts a request (not shown) from each block and outputs, to the RAM controller, an address signal and a control signal (neither is shown), or write data (E2038, E2041, E2044, E2053, E2055, or E2057) when a write operation is to be performed, thereby performing DRAM access. When a read operation is to be performed, the DMA controller E2003 transfers readout data (E2040, E2043, E2045, E2051, E2054, E2056, E2058, or E2059) from the DRAM controller E2004 to the block which has requested.

A 1284 I/F E2006 interfaces by two-way communication with an external host apparatus (not shown) through the parallel I/F E0016 under the control of the CPU E1001 via the CPU I/F E2001. Also, when printing is to be performed, the 1284 I/F E2006 transfers received data (PIF received data E2036) from the parallel I/F E0016 to a reception controller E2008 by DMA processing. When scanner read is to be performed, the 1284 I/F E2006 transmits data (1284 transmission data (RDPIF) E2059) stored in the sending buffer E2028 in the DRAM E2005 to the parallel I/F by DMA processing.

A USB I/F E2007 interfaces by two-way communication with an external host apparatus (not shown) through the serial I/F E0017 under the control of the CPU E1001 via the CPU I/F E2001. Also, when printing is to be performed, the USB I/F E2007 transfers received data (USB received data E2037) from the serial I/F E0017 to the reception controller E2008 by DMA processing. When scanner read is to be performed, the USB I/F E2007 transmits data (USB transmission data (RDPIF) E2058) stored in the sending buffer E2028 in the DRAM E2005 to the serial I/F by DMA processing. The reception controller E2008 writes received data (WDIF) E2038) from a selected one of the 1284 I/F E2006 and the USB I/F E2007 into a receiving buffer write address managed by a receiving buffer controller E2039.

A compression/expansion DMA E2009 reads out, under the control of the CPU E1001 via the CPU I/F E2001, received data (raster data) stored on the receiving buffer E2010 from a receiving buffer read address managed by the receiving buffer controller E2039, compresses or expands readout data (RDWK) E2040 in accordance with a designated mode, and writes the data as a printing code string (WDWK) E2041 in the work buffer area.

A printing buffer transfer DMA E2013 reads out, under the control of the CPU E1001 via the CPU I/F E2001, printing codes (RDWP) E2043 on the work buffer E2011, rearranges each printing code into an address on the print buffer E2014, which is suitable for the order of data transfer to the printhead cartridge H1000, and transfers the code (WDWP E2044). A work clear DMA E2012 repeatedly transfers and writes, under the control of the CPU E1001 via the CPU I/F E2001, designated work file data (WDWF) E2042 in a region on the work buffer to which the data is completely transferred by the printing buffer transfer DMA E2015.

A printing data expanding DMA E2015 reads out, under the control of the CPU E1001 via the CPU I/F E2001, the printing codes rearranged and written on the print buffer and expanding data written on the expanding data buffer E2016, by using a data expansion timing signal E2050 from a head controller E2018 as a trigger, thereby generating expanded printing data (WDHDG) E2045, and writes the generated data as column buffer write data (WDHDG) E2047 in a column buffer E2017. This column buffer E2017 is an SRAM for temporarily storing data (expanded printing data) to be transferred to the printhead cartridge H1000. The column buffer E2017 is shared and managed by the printing data expanding DMA and the head controller in accordance with a handshake signal (not shown) of these two blocks.

Under the control of the CPU E1001 via the CPU I/F E2001, this head controller E2018 interfaces with the printhead cartridge H1000 or the scanner via a head control signal. In addition, on the basis of a head driving timing signal E2049 from an encoder signal processor E2019, the head controller E2018 outputs a data expansion timing signal E2050 to the printing data expanding DMA.

When printing is to be performed, the head controller E2018 reads out expanded printing data (RDHD) E2048 from the column buffer in accordance with the head driving timing signal E2049. The head controller E2018 outputs the readout data to the printhead cartridge H1000 via the head control signal E1021.

In a scanner read mode, the head controller E2018 transfers loaded data (WDHD) E2053 input via the head control signal E1021 to the scanner loading buffer E2024 on the DRAM E2005 by DMA transfer. A scanner data processing DMA E2025 reads out, under the control of the CPU E1001 via the CPU I/F E2001, loading buffer readout data (RDAV) E2054 stored in the scanner loading buffer E2024 into a scanner data buffer E2026 on the DRAM E2005 and writes processed data (WDAV) E2055, subjected to processing such as averaging, into the scanner data buffer E2016 on the DRAM E2005.

A scanner data compressing DMA E2027 reads out processed data (RDYC) E2056 on the scanner data buffer E2026, compresses the data, and writes compressed data (WDYC) E2057 in the sending buffer E2028, under the control of the CPU E1001 via the CPU I/F E2001.

The encoder signal processor E2019 receives an encoder signal (ENC) and outputs the head driving timing signal E2049 in accordance with a mode determined by the control of the CPU E1001. In addition, the encoder signal processor E2019 stores information concerning the position or speed of the carriage M4001, obtained from the encoder signal E1020, into a register and provides the information to the CPU E1001. On the basis of this information, the CPU E1001 determines various parameters for controlling the CR motor E0001. A CR motor controller E2020 outputs a CR motor control signal E1036 under the control of the CPU E1001 via the CPU I/F E2001.

A sensor signal processor E2022 receives output sensing signals from, e.g., the PG sensor E0010, the PE sensor E0007, the ASF sensor E0009, and the GAP sensor E0008, and transmits these pieces of sensor information to the CPU E1001 in accordance with a mode determined by the control of the CPU E1001. The sensor signal processor E2022 also outputs a sensor signal E2052 to an LF/PG motor control DMA E2021.

Under the control of the CPU E1001 via the CPU I/F E2001, this LF/PG motor control DMA E2021 reads out a pulse motor driving table (RDPM) E2051 from a motor control buffer E2023 on the DRAM E2005 and outputs a pulse motor control signal E. In addition, the LF/PG motor control DMA E2021 outputs a pulse motor control signal E1033 by using the abovementioned sensor signal as a trigger of the control.

An LED controller E2030 outputs an LED driving signal E1038 under the control of the CPU E1001 via the CPU I/F E2001. A port controller E2029 outputs the head power ON signal E1022, the motor power ON signal E1023, and the power control signal E1024 under the control of the CPU E1001 via the CPU I/F E2001.

Figure 10:
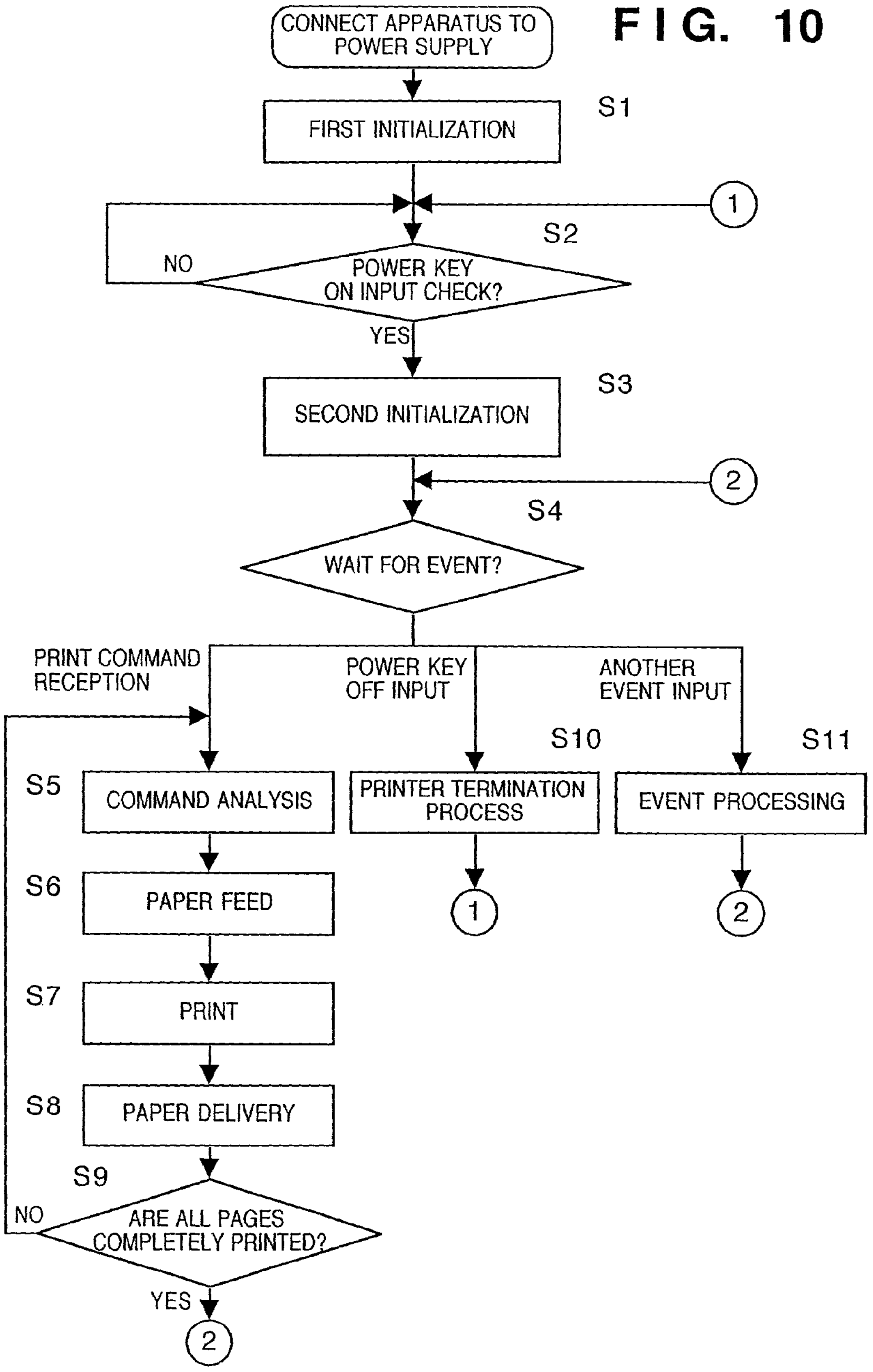
FIG. 10 is a flow chart showing the operation of the embodiment of the present invention.

The operation of the inkjet printing apparatus of this embodiment of the present invention constructed as above will be described below with reference to a flow chart in FIG. 10.

When this apparatus is connected to the AC power supply, in step SI first initialization is performed for the apparatus. In this initialization, the electric circuit system including, e.g., the ROM and RAM of this apparatus is checked, thereby checking whether the apparatus can normally operate electrically.

In step S2, whether the power key E0018 on the upper case M1002 of the apparatus main body M1000 is pressed is checked. If the power key E0018 is pressed, the flow advances to step S3 to perform second initialization.

In this second initialization, the various driving mechanisms and the head system of this apparatus are checked. That is, whether the apparatus is normally operable is checked in initializing the various motors and loading head information.

In step S4, an event is waited for. That is, a command event from the external I/F, a panel key event by a user operation, or an internal control event with respect to this apparatus is monitored. If any of these events occurs, processing corresponding to the event is executed.

For example, if a printing command event is received from the external I/F in step S4, the flow advances to step S5. If a power key event by a user operation occurs in step S4, the flow advances to step S10. If another event occurs in step S4, the flow advances to step S11.

In step S5, the printing command from the external I/F is analyzed to determine the designated paper type, sheet size, printing quality, and paper feed method. Data indicating these determination results is stored in the RAM E2005 of the apparatus, and the flow advances to step S6.

In step S6, paper feed is started by the paper feed method designated in step S5. When the sheet is fed to a printing start position, the flow advances to step S7.

In step S7, printing is performed. In this printing, printing data supplied from the external I/F is once stored in the printing buffer. Subsequently, the CR motor E0001 is driven to start moving the carriage M4001 in the scanning direction, and the printing data stored in the print buffer E2014 is supplied to the printhead cartridge H1000 to print one line. When the printing data of one line is completely printed, the LF motor E0002 is driven to rotate an LF roller M3001 to feed the sheet in the sub-scan direction. After that, the above operation is repeatedly executed. When printing of the printing data of one page supplied from the external I/F is completed, the flow advances to step S8.

In step S8, the LF motor E0002 is driven to drive a sheet delivery roller M2003. Sheet feed is repeated until it is determined that the sheet is completely delivered from this apparatus. When this operation is completed, the sheet is completely delivered onto the sheet delivery tray M1004*a*.

In step S9, whether printing of all pages to be printed is completed is checked. If pages to be printed remain, the flow returns to step S5 to repeat the operation in steps S5 to S9 described above. When printing of all pages to be printed is completed, the printing operation is completed. After that, the flow returns to step S4 to wait for the next event.

In step S10, a printer termination process is performed to stop the operation of this apparatus. That is, to shut off the power supply to the various motors and the head, the operation transits to a state in which the power supply can be shut off. After that, the power supply is shut off, and the flow returns to step S4 to wait for the next event.

In step S11, event processing other than the above is performed. For example, processing corresponding to any of the diverse panel keys of this apparatus, a recovery command from the external I/F, or an internally occurring recovery event is performed. After the processing, the flow advances to step S4 to wait for the next event.

[First Embodiment]

The first embodiment of a circuit formed on (built-in) the printhead element substrate (printing element substrate H1100) of the above-mentioned printer will be explained.

Figure 11:
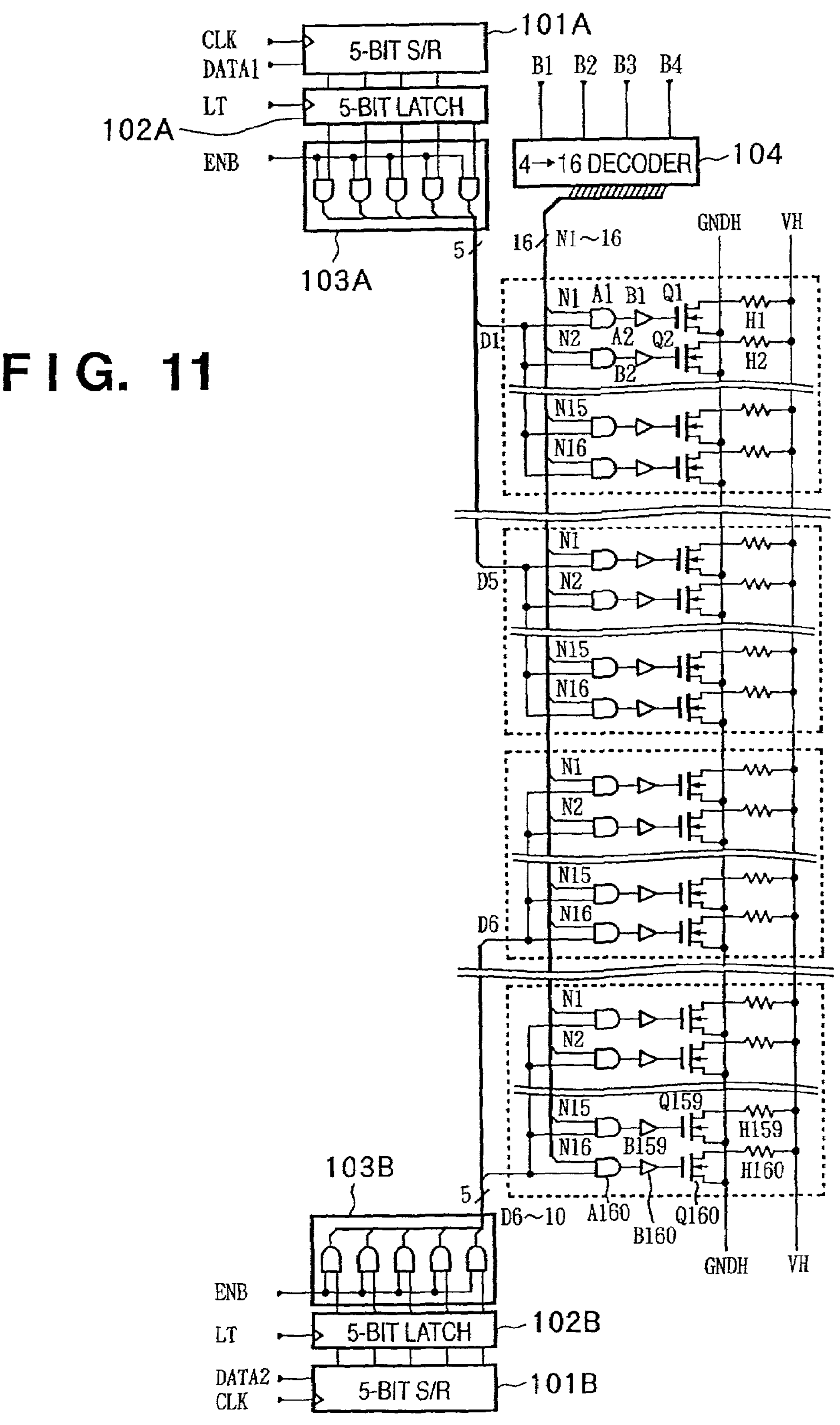
FIG. 11 is a circuit diagram showing the arrangement of a circuit on the element substrate of a printhead according to the first embodiment of the present invention.

FIG. 11 is a circuit diagram showing the arrangement of a circuit formed on (built-in) the substrate of a printhead according to the first embodiment. In the first embodiment, 160 heaters are arranged as printing elements, and groups each including 16 heaters are time-divisionally driven.

Reference numerals 101A and 101B denote shift register circuits for storing 5-bit data serially transferred by data signals DATA1 and DATA2 in synchronism with a CLK signal; 102A and 102B, latch circuits for latching the 5-bit data output from the shift register circuits 101A and 101B in accordance with a latch signal LT; 103A and 103B, ENB circuits for deriving a logical product of outputs from the latch circuits and an ENB signal and outputting the ANDs to D1 to D5 and D6 to D10; and 104, a decoder circuit for selecting any of N1 to N16 on the basis of a combination of signals B1 to B4.

As seen therefrom, the shift register circuits 101 corresponding to one printing element array are divided into two (101A, 101B) in a longitudinal direction of the element substrate, and each shift register circuits supplies data to printing elements located nearby. On the other hand, the decoder circuit is commonly used for one printing element array, since the selection of blocks is performed to drive the printing elements apart with each other (dispersed printing elements) simultaneously so that the ink refill characteristic is improved.

Reference symbols H1 to H160 denote heater resistors as printing elements which are commonly connected to a heater power supply VH; Q1 to Q160, transistors for controlling energization to the heater resistors; A1 to A160, AND circuits for deriving a logical product of the outputs N1 to N16 from the decoder circuit 104 and the outputs D1 to D10 from the ENB circuits; and B1 to B160, buffer circuits for driving the transistors Q1 to Q160 in accordance with outputs from the AND circuits A1 to A160.

In this embodiment, as shown in FIG. 11, the shift resistors 101, latches 102, and ENB circuits 103 are arranged for two systems A and B each corresponding to 80 heaters.

Figure 12:
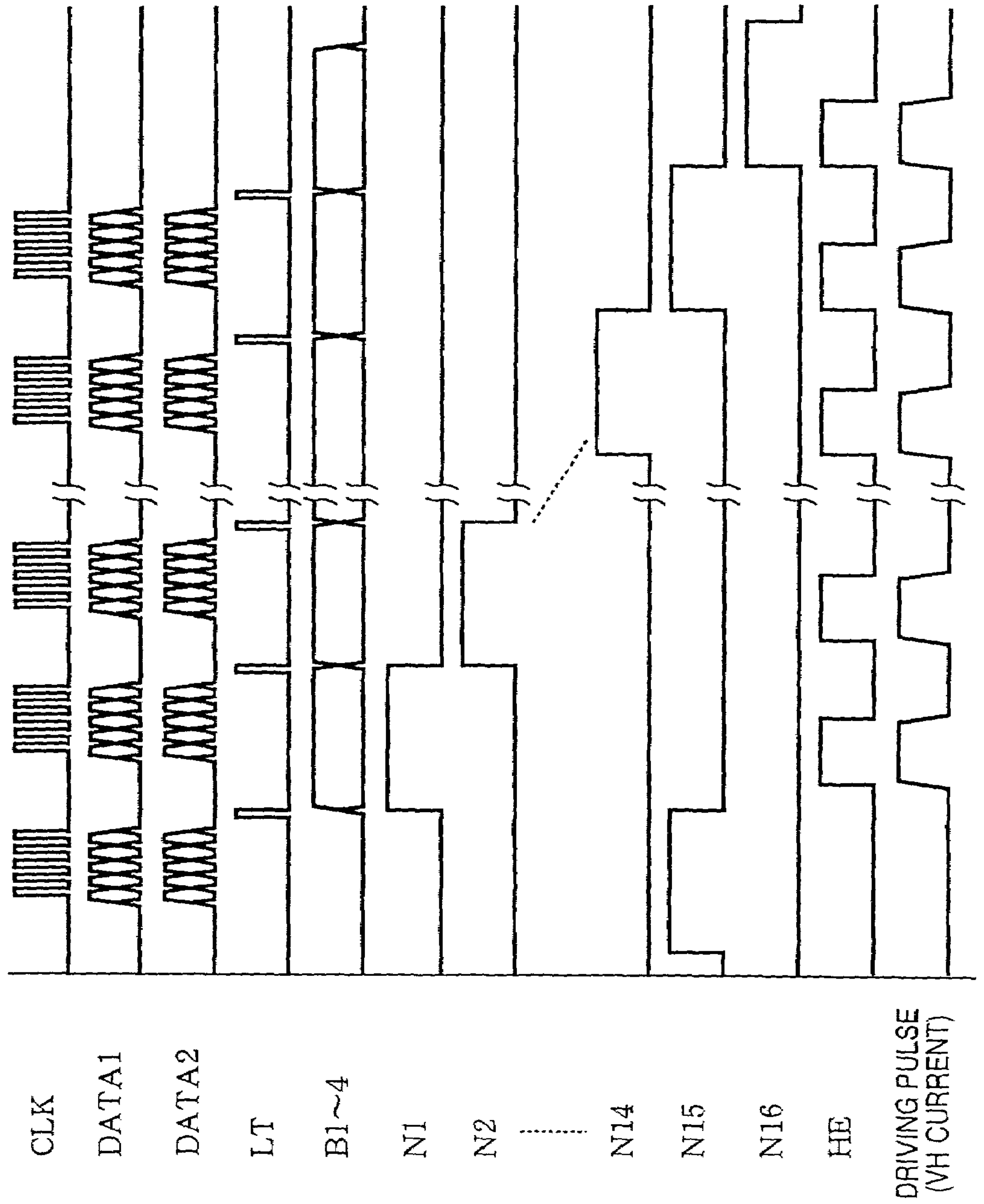
FIG. 12 is a timing chart for explaining the operation of the circuit in FIG. 11.

The operation of the driving circuit in FIG. 11 will be explained with reference to the timing chart of FIG. 12. The timing chart of FIG. 12 corresponds to one sequence (one discharge period) for selecting arbitrary heaters from 160 heaters once.

First, 10-bit data corresponding to image data are serially transferred as two 5-bit data parallel to each other to the shift register circuits 101A and 101B by two signals DATA1 and DATA2 in synchronism with the common clock signal CLK.

The latch signal LT common to the both latch circuits changes to "High", and the serial data are respectively latched by the latch circuits 102A and 102B.

The signals B1 to B4 are input to the decoder circuit 104 which selects any one of the signal lines N1 to N16. In this case, N1 to N16 are sequentially selected. However, the actual temporal selection order of the signals N1 to N16 is different from the layout order of heater arrays because, if adjacent nozzles are successively driven, the printing quality may degrade under the influence of ink discharge by adjacent nozzles.

In this case, the signal line N1 changes to "High" to select heaters of respective groups that are connected to N1. The 10-bit image data are image information of 10 heaters connected to N1, and latched as outputs from the latches 102A and 102B while N1 is selected. Outputs from the latches 102A and 102B are output to the signal-lines D1 to D10 before the ENB signal (HE) changes to "High". Each of the signal lines D1 to D10 is commonly connected to 16 bits of a corresponding one of 10 groups. Heaters connected to N1 in groups selected by D1 to D10 are driven by a pulse width corresponding to the "High" duration of the ENB signal.

Similarly, 10-bit image data corresponding to N2 are serially transferred as two 5-bit data parallel to each other to the shift register circuits 101A and 101B by two signals DATA1 and DATA2 in synchronism with the clock signal CLK. After transfer, the latch signal LT changes to "High", the image data are latched, N2 is selected by the signals B1 to B4 input to the decoder, and heaters connected to N2 are driven by a pulse width corresponding to the "High" duration of the HE signal in correspondence with the image data.

By sequentially repeating this operation 16 times, the 160 heaters can be time-divisionally driven in units of 10 heaters at 16 timings.

More specifically, the 160 heaters are classified into 10 groups each including 16 heaters. One sequence time is divided into 16 timings so as not to simultaneously drive two or more heaters in a group. Image data of 10 bits are transferred as two 5-bit data to the two shift registers within the divided time, and corresponding heaters are driven within the same time.

Figure 13:
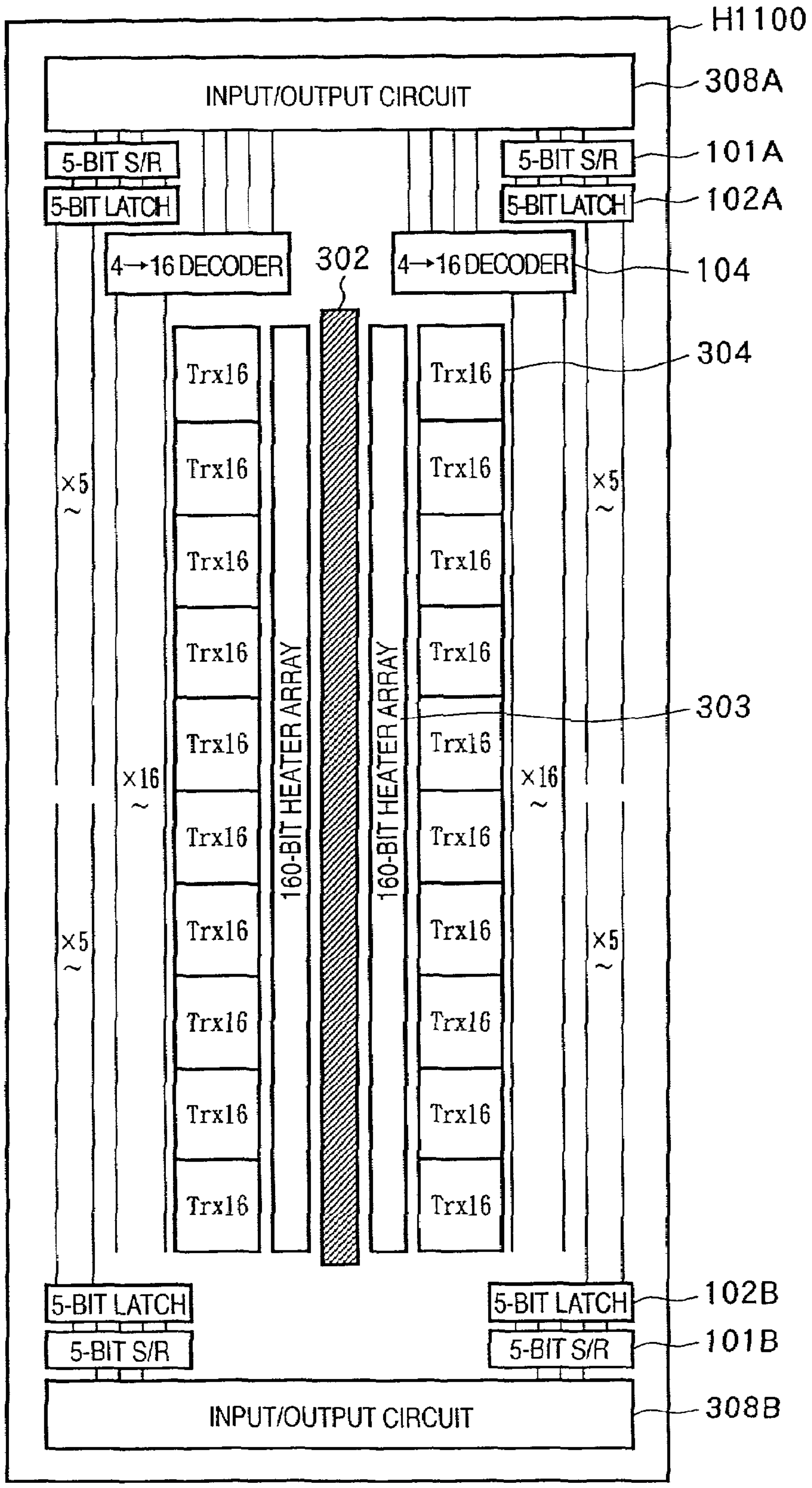
FIG. 13 is a view showing a layout in which the circuit of FIG. 11 is formed on the element substrate.

FIG. 13 shows a layout in which the circuit of FIG. 11 is formed on the printing element substrate H1100. Reference numeral 302 denotes an ink supply opening. Ink supplied from the lower surface of the substrate passes through the ink supply opening 302 and is supplied to the upper surface of the substrate on which heaters are formed. By heating the heaters and forming bubbles in the ink, the ink supplied on the heaters through the ink channel is discharged in a direction perpendicular to the upper surface of the substrate from discharge openings formed on the upper surface of the substrate.

In the layout shown in FIG. 13, two 160-bit heater arrays are arranged on the two sides of the ink supply opening 302. In this case, the left heater array in FIG. 13 is shifted from the right heater array in the array direction by half the pitch. Thus, data can be printed at a density double the pitch of one heater array.

The layout of FIG. 13 will be explained. In the layout of FIG. 13, two systems of circuits of FIG. 11 are symmetrically arranged by putting the ink supply opening between them. Respective 160-bit heater arrays 303 are connected to driving circuits. Each heater array 303 is divided into 10 groups in units of 16 heaters sequentially along the array direction. Ten driving circuit groups 304 each comprised of 16 driving circuits are formed in correspondence with the respective groups. Each driving circuit group 304 is constituted by AND circuits, buffer circuits, and driving elements (transistors) in FIG. 11. The AND circuit receives an output signal from the decoder 104 and an output signal from a latch circuit 307.

The printing element substrate H1100 is electrically connected to an external device via input/output circuits 308A and 308B, which are respectively disposed on the two sides in the direction along which the heater arrays extend. The shift register circuits 101A and 101B and the latch circuits 102A and 102B are also disposed on the two sides in correspondence with the input/output circuits 308A and 308B in the direction along which the heater arrays extend.

Output signals from the latch circuits 102A and 102B and output signals from the decoders 101A and 101B are supplied along the lines of the driving circuit groups 304 so as to be connected to each driving circuit group 304. Sixteen output signals from each decoder 104 are connected to 16 AND circuits in each of the 10 driving circuit groups 304.

Output signals from the latch circuits 102A and 102B are respectively connected to corresponding driving circuit groups 304. In the first embodiment, the input/output circuits 308, shift register circuits 101, and latch circuits 102 which receive image data are arranged at the two ends in the heater array direction. Image data to be input to half of all the heaters are supplied to the input/output circuits, and each latch circuit 102 outputs signals to five driving circuit groups 304.

As a result, signal paths extending from the latch circuits 102 on the two sides are laid out without crossing each other. The area occupied by signal lines running from the latch circuits to the driving circuit groups with respect to the substrate can be substantially halved in comparison with a case wherein a 10-bit shift register circuit and latch circuit are arranged on one side. Particularly, the short side of a printing element substrate elongated in the heater array direction can be effectively reduced.

When the number of nozzles increases for high printing speed and high resolution, the number of signal lines within the substrate and the length of the printing element substrate in the heater array direction also increase. In this case, shift register circuits are separately mounted, reducing the wiring area and effectively reducing the chip size.

The length of a signal line running from the latch circuit is about ½ that of the printing element substrate at most, and is about ½ that of a signal line in a case wherein latches are arranged on one side. Shortening the signal line can decrease a delay on the signal line to realize high-speed operation, and can decrease the possibility of malfunctions caused by external noise.

[Second Embodiment]

The second embodiment of a circuit formed on (built-in) the printhead element substrate (printing element substrate H1100) of the above-mentioned printer will be explained. A description of a part common to the first embodiment will be omitted, and only the characteristic part of the second embodiment will be described.

Figure 14:
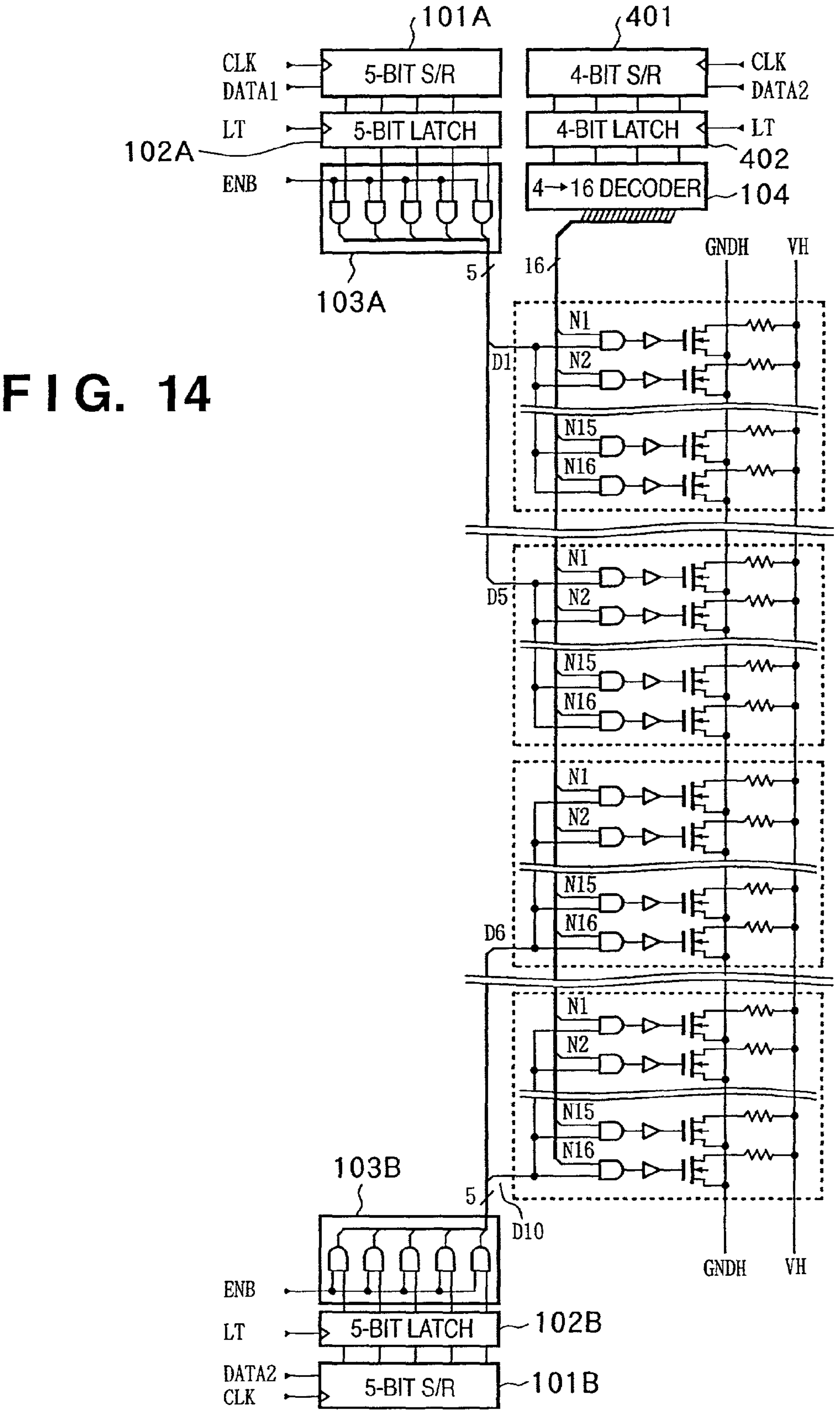
FIG. 14 is a circuit diagram showing the arrangement of a circuit on the element substrate of a printhead according to the second embodiment of the present invention.

FIG. 14 is a circuit diagram showing the arrangement of a circuit formed on (built-in) the substrate of a printhead according to the second embodiment. In the second embodiment, the input signals B1 to B4 to the decoder circuit 104 in the first embodiment are transferred and input as 4-bit serial data through one signal line.

For this purpose, the second embodiment employs a 4-bit shift register circuit 401 and 4-bit latch circuit 402. With this arrangement, 4-bit data corresponding to B1 to B4 in the first embodiment are serially input to a DATA input terminal of the shift register circuit 401 in synchronism with CLK. Outputs from the shift register circuit 401 are input to the 4-bit latch circuit 402 where their contents are latched in accordance with a latch signal LT. The latched output signals are input to a decoder 104, similar to the signals B1 to B4 in FIG. 11.

Figure 15:
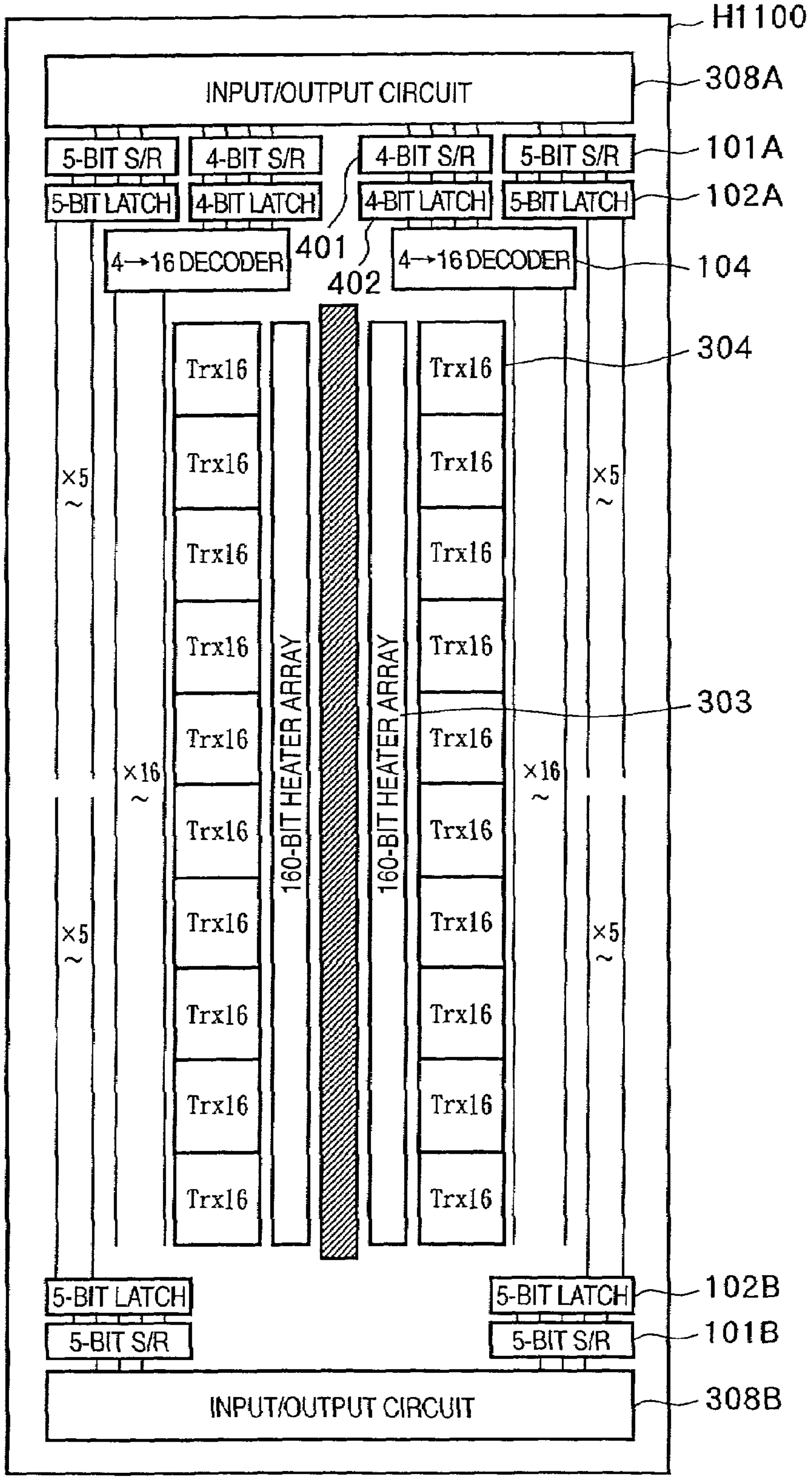
FIG. 15 is a view showing a layout in which the circuit of FIG. 14 is formed on the element substrate.
Figure 16:
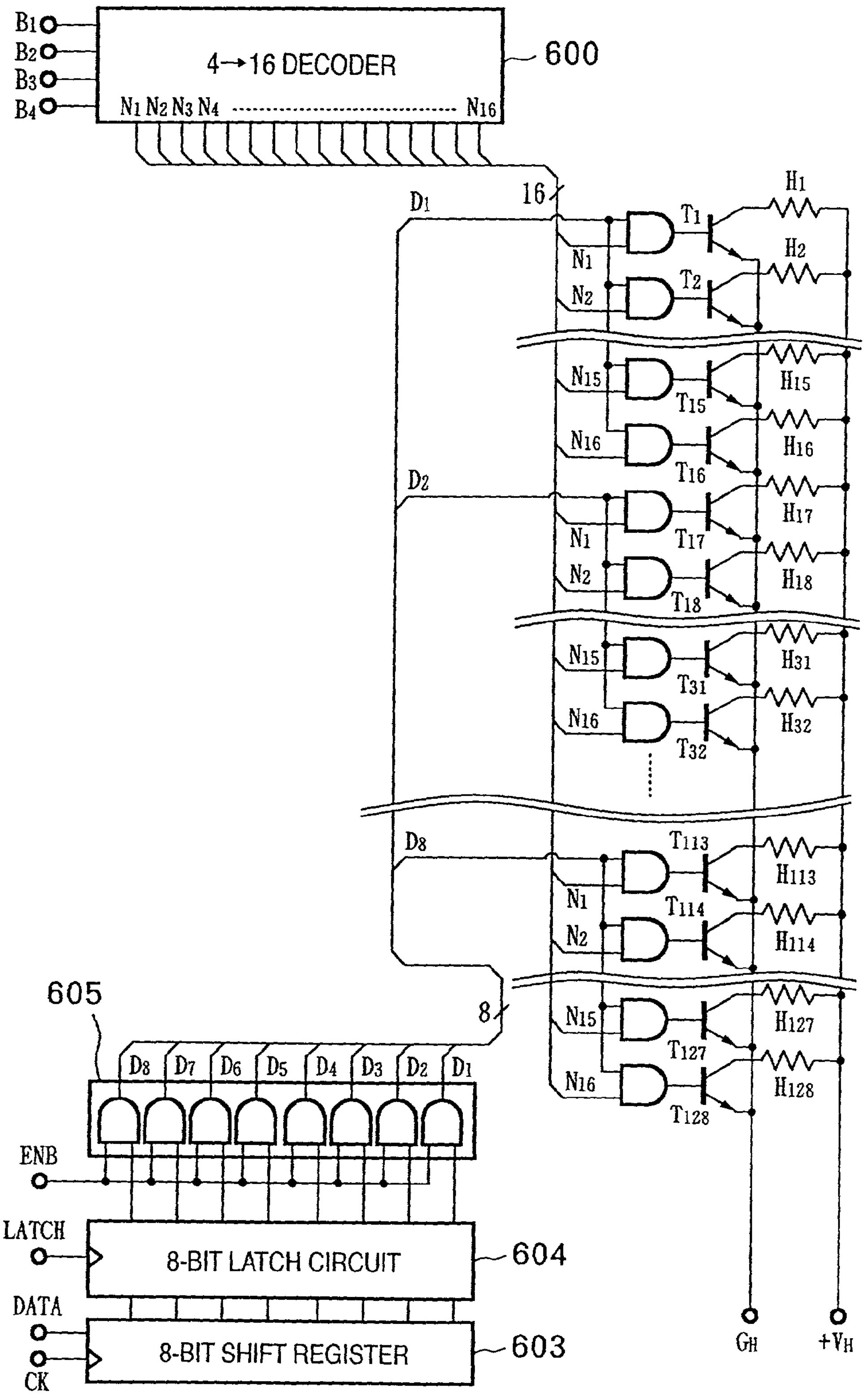
FIG. 16 is a circuit diagram showing the arrangement of a circuit on the element substrate of a conventional printhead.
Figure 17:
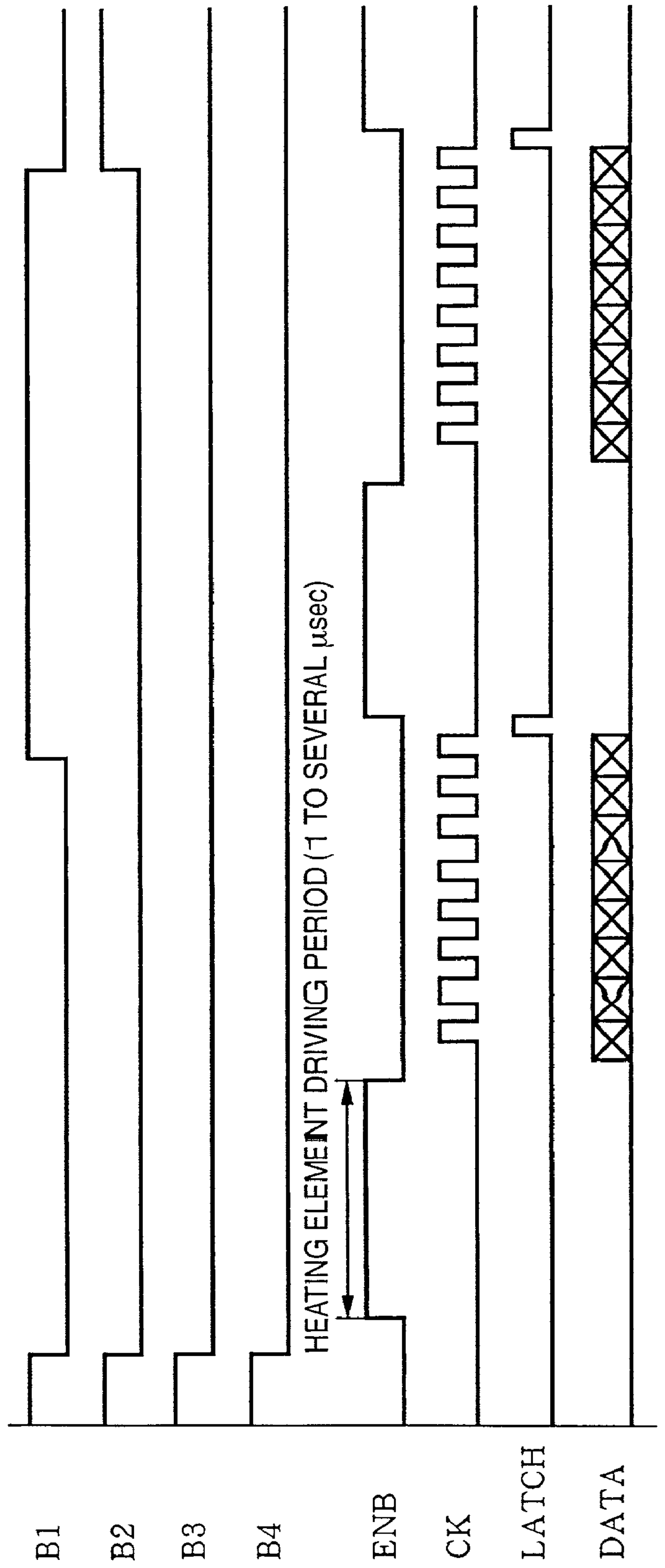
FIG. 17 is a timing chart for explaining the operation of the circuit in FIG. 16.
Figure 18:
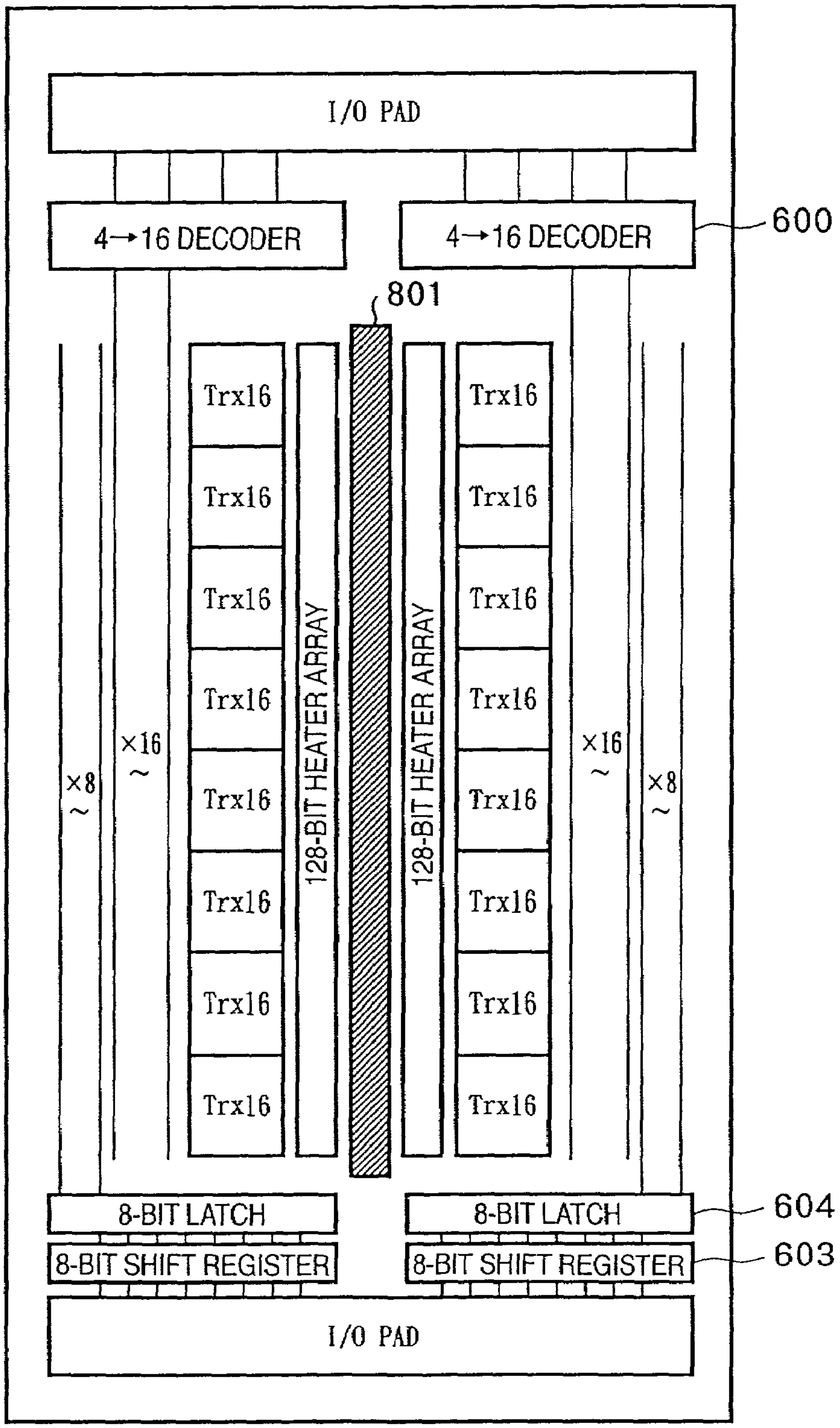
FIG. 18 is a view showing a layout in which the circuit of FIG. 16 is formed on the element substrate.

FIG. 15 shows a layout in which the circuit of FIG. 14 is formed on the printing element substrate H1100. The 4-bit shift register circuit 401 and latch circuit 402 are disposed in correspondence with each decoder. The CLK and DATA signals input to the 4-bit shift register circuit and the latch signal LT to the 4-bit latch circuit can be common to signals input to image data input shift registers.

The second embodiment can reduce the number of signals input to the decoder, in addition to the effects of the first embodiment.

[Other Embodiment]

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal.

By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention.

In the present invention, the above-mentioned film boiling system is most effective for the above-mentioned inks.

The present invention can be applied to a system constituted by a plurality of devices (e.g., host computer, interface, reader, printer) or to an apparatus comprising a single device (e.g., copying machine, facsimile machine).

As many apparently widely different embodiments of the present invention can be made without departing from the spirit and scope thereof, it is to be understood that the invention is not limited to the specific embodiments thereof except as defined in the appended claims.

What is claimed is:

1. An inkjet print head substrate on which is provided a print head assembly, the print head assembly comprising:

an ink supply opening;

an array of printing elements provided along one long side of the ink supply opening and divided into a plurality of groups of printing elements;

an array of driving circuits provided along one long side of the ink supply opening and arranged to correspond to the printing elements, respectively, for driving the corresponding printing elements, respectively;

a selection circuit common to the plurality of groups of printing elements of the array for selecting a printing element to be driven in each group; and data supply means for supplying driving data to the driving circuits, wherein the selection circuit has common lines through which electric signals are supplied for driving the plurality of groups of printing elements of the away by selecting a printing element to be driven in each group, wherein the data supply means comprises a plurality of shift registers, the plurality of shift registers are provided at one side with respect to extension lines extending from both longitudinal ends of the ink supply opening, and each shift register is arranged to supply driving data to one or more of the driving circuits for driving the corresponding printing elements, of the plurality of groups of printing elements, which are closer than non-corresponding printing elements to the shift register, wherein another array of printing elements, another array of driving circuits, and another selection circuit are provided along another long side of the ink supply opening, and wherein the data supply means further comprises another plurality of shift registers, provided at another side with respect to the extension lines.

2. A print head substrate according to claim 1, wherein a plurality of the print head assemblies are provided on the substrate.

3. A print head substrate according to claim 1, wherein the pluralities of shift registers receive clock and data signals, and the data supply means further comprises a plurality of latches for latching output signals from the shift registers, and AND circuits for deriving a logical product of outputs from the latches and a driving signal.

4. A print head substrate according to claim 3, wherein the arrays of printing elements extend alongside an ink supply port.

5. A print head substrate according to claim 1, wherein there are two shift registers arranged at respective ends of the printing element arrays.

6. A print head substrate according to claim 1, wherein the arrays of printing elements extend alongside an ink supply port.

7. A print head substrate according to claim 1, wherein said selection circuits are arranged at one end of the printing element arrays.

8. A print head substrate according to claim 1, wherein said substrate is a rectangle and the printing element arrays extend along the length of the rectangle.

9. An inkjet print head comprising an inkjet print head substrate on which is provided a print head assembly, the print head assembly comprising:

an ink supply opening;

an array of printing elements provided along one long side of the ink supply opening and divided into a plurality of groups of printing elements;

an array of driving circuits provided along one long side of the ink supply opening and arranged to correspond to the printing elements, respectively, for driving the corresponding printing elements, respectively;

a selection circuit common to the plurality of groups of printing elements of the array for selecting a printing element to be driven in each group; and data supply means for supplying driving data to the driving circuits, wherein the selection circuit has common lines through which electric signals are supplied for driving the plurality of groups of printing elements of the away by selecting a printing element to be driven in each group, wherein the data supply means comprises a plurality of shift registers, the plurality of shift registers are provided at one side with respect to extension lines extending from both longitudinal ends of the ink supply opening, and each shift register is arranged to supply driving data to one or more of the driving circuits for driving the corresponding printing elements, of the plurality of groups of printing elements, which are closer than non-corresponding printing elements to the shift register wherein another array of printing elements, another array of driving circuits, and another selection circuit are provided along another long side of the ink supply opening, and wherein the data supply means further comprises another plurality of shift registers, provided at another side with respect to the extension lines.

10. A print head according to claim 9, wherein the print head is an ink jet head for printing data by discharging ink.

11. A print head according to claim 10, wherein the print head comprises electrothermal transducing means for generating thermal energy to cause ink discharge.

12. An inkjet print head cartridge comprising:

an inkjet print head having an inkjet print head substrate on which is provided a print head assembly, the print head assembly comprising an ink supply opening, an array of printing elements provided along one long side of the ink supply opening and divided into a plurality of groups of printing elements, an array of driving circuits provided along one long side of the ink supply opening and arranged to correspond to the printing elements, respectively, for driving the corresponding printing elements, respectively, a selection circuit common to the plurality of groups of printing elements of the away for selecting a printing element to be driven from each group, and data supply means for supplying driving data to the driving circuits, wherein the selection circuit has common lines through which electric signals are supplied for driving the plurality of groups of printing elements of the away by selecting a printing element to be driven from each group, wherein the data supply means comprises a plurality of shift registers, the plurality of shift registers are provided at one side with respect to extension lines extending from both longitudinal ends of the ink supply opening, and each shift register is arranged to supply driving data to one or more of the driving circuits for driving the corresponding printing elements, of the plurality of groups of printing elements, which are closer than non-corresponding printing elements to the shift register, wherein another array of printing elements, another array of driving circuits, and another selection circuit are provided along another long side of the ink supply opening, and wherein the data supply means further comprises another plurality of shift registers, provided at another side with respect to the extension lines; and an ink tank for storing ink to be supplied to the inkjet print head.

13. A printing apparatus for printing data, the apparatus comprising:

an inkjet print head having an inkjet print head substrate on which is provided a print head assembly, the print head assembly comprising an ink supply opening, an array of printing elements provided along one long side of the ink supply opening and divided into a plurality of groups of printing elements, an array of driving circuits provided along one long side of the ink supply opening and arranged to correspond to the printing elements, respectively, for driving the corresponding printing elements, respectively, a selection circuit common to the plurality of groups of printing elements of the away for selecting a printing element to be driven from each group, and data supply means for supplying driving data to the driving circuits, wherein the selection circuit has common lines through which electric signals are supplied for driving the plurality of groups of printing elements of the away by selecting a printing element to be driven from each group, wherein the data supply means comprises a plurality of shift registers, the plurality of shift registers are provided at one side with respect to extension lines extending from both longitudinal ends of the ink supply opening, and each shift register is arranged to supply driving data to one or more of the driving circuits for driving the corresponding printing elements, of the plurality of groups of printing elements, which are closer than non-corresponding printing elements to the shift register, wherein another array of printing elements, another array of driving circuits, and another selection circuit are provided along another long side of the ink supply opening, and wherein the data supply means further comprises another plurality of shift registers, provided at another side with respect to the extension lines; and driving data generation means for generating a data signal for each path of the shift registers.

* * * * *

UNITED STATES PATENT AND TRADEMARK OFFICE

CERTIFICATE OF CORRECTION

PATENT NO. : 7,321,444 B2
APPLICATION NO. : 09/902756
DATED : January 22, 2008
INVENTOR(S) : Nobuyuki Hirayama It is certified that error appears in the above-identified patent and that said Letters Patent is hereby corrected as shown below:

COLUMN 1:
Line 57, "reference-symbols" should read -- reference symbols --.

COLUMN 5:
Line 28, "An" should read -- A --.
Line 32, "an" should read -- a --.
Line 33, both occurrences of "an" should read -- a --.
Line 34, "an" should read -- a --.
Line 37, "an" should read -- a --.

COLUNN 19:
Line 12, "away" should read -- array --.

COLUMN 20:
Line 8, "away" should read -- array --.
Line 19, "register" should read -- register, --.
Line 44, "away" should read -- array --.
Line 49, "away" should read -- array --.

COLUMN 21:
Line 14, "away" should read -- array --.
Line 19, "away" should read -- array --.

Signed and Sealed this

Thirty-first Day of March, 2009

JOHN DOLL
*Acting Director of the United States Patent and Trademark Office*